US007320482B2

(12) United States Patent
Toyoshima et al.

(10) Patent No.: US 7,320,482 B2
(45) Date of Patent: Jan. 22, 2008

(54) SEMICONDUCTOR INTEGRATED CIRCUIT DEVICE

(75) Inventors: Hiroshi Toyoshima, Akiruno (JP); Masahiko Nishiyama, Ome (JP)

(73) Assignees: Hitachi ULSI Systems Co., Ltd., Tokyo (JP); Renesas Technology Corp., Tokyo (JP)

( * ) Notice: Subject to any disclaimer, the term of this patent is extended or adjusted under 35 U.S.C. 154(b) by 0 days.

(21) Appl. No.: 11/730,733

(22) Filed: Apr. 3, 2007

(65) Prior Publication Data

US 2007/0176580 A1 Aug. 2, 2007

(51) Int. Cl.
*G05F 1/40* (2006.01)
*G05F 1/44* (2006.01)
*H02H 7/00* (2006.01)

(52) U.S. Cl. ........................ 282/271; 282/280; 282/282

(58) Field of Classification Search ................ 323/237, 323/239, 246, 268, 271, 273, 280, 282, 285; 365/148, 149, 174, 226–229

See application file for complete search history.

(56) References Cited

U.S. PATENT DOCUMENTS

| | | | | |
|---|---|---|---|---|
| 4,908,566 | A | 3/1990 | Tesch | |
| 5,204,639 | A | 4/1993 | Moore et al. | |
| 5,631,598 | A | 5/1997 | Miranda et al. | |
| 6,194,887 | B1 | 2/2001 | Tsukada | |
| 6,448,750 | B1 * | 9/2002 | Shor et al. | 323/282 |
| 6,498,469 | B2 | 12/2002 | Kobayashi | |
| 6,518,737 | B1 | 2/2003 | Stanescu et al. | |
| 6,690,147 | B2 | 2/2004 | Bonto | |
| 6,771,119 | B2 | 8/2004 | Ochi | |
| 6,861,829 | B2 * | 3/2005 | Schreck | 323/282 |
| 7,002,401 | B2 * | 2/2006 | Khalid | 327/541 |
| 7,164,561 | B2 * | 1/2007 | Wang et al. | 361/18 |
| 2001/0011886 | A1 | 8/2001 | Kobayashi | |

FOREIGN PATENT DOCUMENTS

| | | |
|---|---|---|
| JP | 4-006693 | 4/1990 |
| JP | 4-017190 | 5/1990 |
| JP | 2001-507484 | 6/1996 |
| JP | 10-270957 | 3/1997 |
| JP | 2000-075941 | 8/1998 |
| JP | 2000-148263 | 11/1998 |
| JP | 2001-216034 | 1/2000 |

* cited by examiner

*Primary Examiner*—Matthew V. Nguyen
(74) *Attorney, Agent, or Firm*—Reed Smith LLP; Stanley P. Fisher, Esq.; Juan Carlos A. Marquez, Esq.

(57) ABSTRACT

The invention intends to provide a technique that achieves a sufficient phase margin with ease. The circuit includes a power supply circuit that is formed with a phase compensating resistor and a phase compensating capacitor, between a second input terminal of a differential amplifier and a low supply voltage. Thereby, the first pole frequency in the overall gain is determined by the first pole frequency in the voltage-dividing resistor stage in the Bode diagram for the pole/zero compensation, which is shifted to a lower frequency. Also, the zero point cancels the first pole frequency in the differential amplifier stage, which reduces the phase delay to secure the phase margin. And, since the phase compensating resistor can take a considerably high resistance, the same characteristic can be achieved with a low capacitance of the phase compensating capacitor; thereby, the phase compensation becomes possible with a resistor and a capacitor having a smaller size than the pole/zero compensation with the internal supply voltage.

12 Claims, 21 Drawing Sheets

SEMICONDUCTOR INTEGRATED CIRCUIT DEVICE

BACKGROUND OF THE INVENTION

The present invention relates to a semiconductor integrated circuit device, more specifically to a phase compensation technique for amplifiers that the circuit device contains.

As a general trend in the semiconductor integrated circuit device, the withstanding voltage is being lowered, accompanied with the advancement of micro fabrication of MOS transistors. Accordingly, when a high supply voltage VDD is supplied from the outside, an internal supply voltage VDDI being lower than VDD is generated on the basis of the high supply voltage VDD, and the internal supply voltage VDDI is supplied to internal circuits as the operational supply voltage. Such an internal supply voltage VDDI is generated by means of a limiter circuit (named also as voltage-dropping circuit).

The limiter circuit includes a p-channel MOS transistor called a driver PMOS, and a differential amplifier that drives the driver PMOS on the basis of the comparison result of a detected voltage of the internal supply voltage VDDI and a reference voltage VREF. The high supply voltage VDD is lowered by the voltage across the source and drain of the driver PMOS, whereby the internal supply voltage VDDI is generated. When the level of the internal supply voltage VDDI is varied, the variations are reflected to the comparison result with the reference voltage VREF, and the feedback control of the internal supply voltage VDDI is carried out, whereby the voltage level of the internal supply voltage VDDI is stabilized.

In order to prevent oscillations in the circuit, the limiter circuit is provided with a phase compensation circuit. As the phase compensation circuit, the pole/zero compensation system can be quoted. The pole/zero compensation system connects a phase compensating resistor and a phase compensating capacitor in series between the internal supply voltage VDDI and a low supply voltage VSS to secure a phase margin.

As an example, Japanese Unexamined Patent Publication No. 2002-25260 discloses a semiconductor integrated circuit device in which an externally supplied voltage is let down to a lower voltage to be supplied to internal circuits.

SUMMARY OF THE INVENTION

To increase the current supply capability accompanied with the increase of current consumption, it will be required in general to apply a fine-patterned dimension to the gate length of the driver PMOS.

However, applying a short gate length to the driver PMOS will decrease the drain conductance of the driver PMOS. Accordingly, the size of the capacitor and resistor in the pole/zero compensation system will be increased according to the following reason.

The pole/zero compensation system is regarded as effective when the first pole frequency of the driver PMOS output stage is located in a lower frequency than the first pole frequency of the differential amplifier stage, which shifts the first pole frequency of the driver PMOS output stage to a further lower frequency by the series circuit of a phase compensating resistor Rc1 and a phase compensating capacitor Cc1, cancels the first pole frequency of the differential amplifier stage by the zero point, and thereby reduces the phase delay to secure the phase margin. However, as the drain conductance of the driver PMOS output stage decreases, the first pole frequency of the driver PMOS output stage shifts to a higher frequency. In this case, if it is intended to shift the first pole frequency of the driver PMOS output stage to a lower frequency than the first pole frequency of the differential amplifier stage by means of only the pole/zero compensation system, a considerably large capacitance is required for the phase compensating capacitor. To attain a large capacitance necessitates parallel connections by many capacitors, which increases the chip occupancy area for the phase compensating capacitor. And, the phase compensating resistors connected in series to the individual phase compensating capacitors are mutually connected in parallel to thereby lower the composite resistance, which hinders appropriate phase compensation. Therefore, when more capacitors are connected in parallel, the phase compensating resistors connected in series to the individual phase compensating capacitors have to use resistors having still higher resistances. As the resistance becomes higher, the chip occupancy area for the phase compensating resistor will necessarily be increased to that extent.

In this manner, when the drain conductance of the driver PMOS is low, it is unavoidable that the chip occupancy area for the phase compensating capacitor and the phase compensating resistor becomes increased in the pole/zero compensation system. However, there is practically a certain limit in the occupancy area for the phase compensating capacitor and the phase compensating resistor from the restriction of the chip size, which makes it difficult to attain a sufficient phase margin.

It is therefore an object of the invention to provide a technique that achieves a sufficient phase margin with ease.

Another object of the invention is to provide a technique that reduces the chip occupancy area for the phase compensating capacitor and the phase compensating resistor.

The foregoing and other objects and the novel features of the invention will become apparent from the descriptions and appended drawings of this specification.

The typical ones of the claims disclosed here will briefly be described as follows.

According to one aspect of the invention, the semiconductor integrated circuit device includes: a differential amplifier including a first input terminal, a second input terminal, and an output terminal, being supplied with a high supply voltage and a low supply voltage, which amplifies a difference of an input signal from the first input terminal and an input signal from the second input terminal to output the result from the output terminal; a transistor that is controlled on the basis of a signal outputted from the output terminal of the differential amplifier, and generates a voltage different from the high supply voltage from the same voltage; a first resistor connected between the output terminal of the transistor and the second input terminal of the differential amplifier; and a second resistor connected between the second input terminal of the differential amplifier and the low supply voltage. And in addition, the circuit device possesses a power supply circuit including a phase compensating capacitor, between the second input terminal of the differential amplifier and the low supply voltage.

According to the above means, in the Bode diagram for the pole/zero compensation, the first pole frequency in the overall gain is determined by the first pole frequency in the voltage-dividing resistor stage to be shifted to a lower frequency. And, since the first pole frequency in the differential amplifier stage is cancelled by the zero point in the Bode diagram for the pole/zero compensation, and thereby the phase delay is reduced; thus, the phase margin will be secured. Since the amplitude at the non-inverted input terminal of the differential amplifier is decreased to a low level by means of the voltage-dividing circuit of the first and second resistors, the circuit can be configured with a lower resistance and capacitance than those of the phase compensating resistor and phase compensating capacitor for executing the pole/zero compensation with the internal supply voltage (VDDI).

As the result, the resistance of the metal wiring for the internal supply voltage VDDI can be reduced without considering the phase margin of the limiter circuit, and the stable operation of the limiter circuit can be secured accordingly. Further, the circuit is allowed to take on a device with a short gate length as the transistor, without apprehension of the drain conductance, which makes it possible to form a limiter circuit suitable for a chip that consumes a considerably high current.

In this case, the circuit may include a reference voltage generation circuit that generates a reference voltage, so as to supply the reference voltage to the first input terminal.

The power supply circuit may include a first phase compensating resistor provided between the second input terminal and the first phase compensating capacitor.

In case of need, the circuit may include a second phase compensating capacitor and a second phase compensating resistor connected in series thereto between the output terminal of the transistor and the low supply voltage.

In order to further expand the phase margin, the circuit may include a capacitor for reducing a phase delay in the high frequency between the output terminal of the transistor and the second input terminal of the differential amplifier, and the capacitor may be used in combination with the first phase compensating resistor and the first phase compensating capacitor.

The first phase compensating resistor may use a resistance of a metal wiring; or it may adopt a resistor using a diffusion layer formed on the semiconductor substrate, or a resistor using a conductive layer formed on the semiconductor substrate, or a resistor using a poly-silicon layer.

The first phase compensating capacitor may be a capacitor using an oxide film formed on a semiconductor substrate as a dielectric, or a capacitor using an insulating film formed on a semiconductor substrate as a dielectric. In this case, the insulating film may be a gate oxide film.

The foregoing power supply circuit can be installed in various semiconductor integrated circuit devices such as an SRAM, a DRAM, etc.

DETAILED DESCRIPTION OF THE PREFERRED EMBODIMENTS

Figure 10:
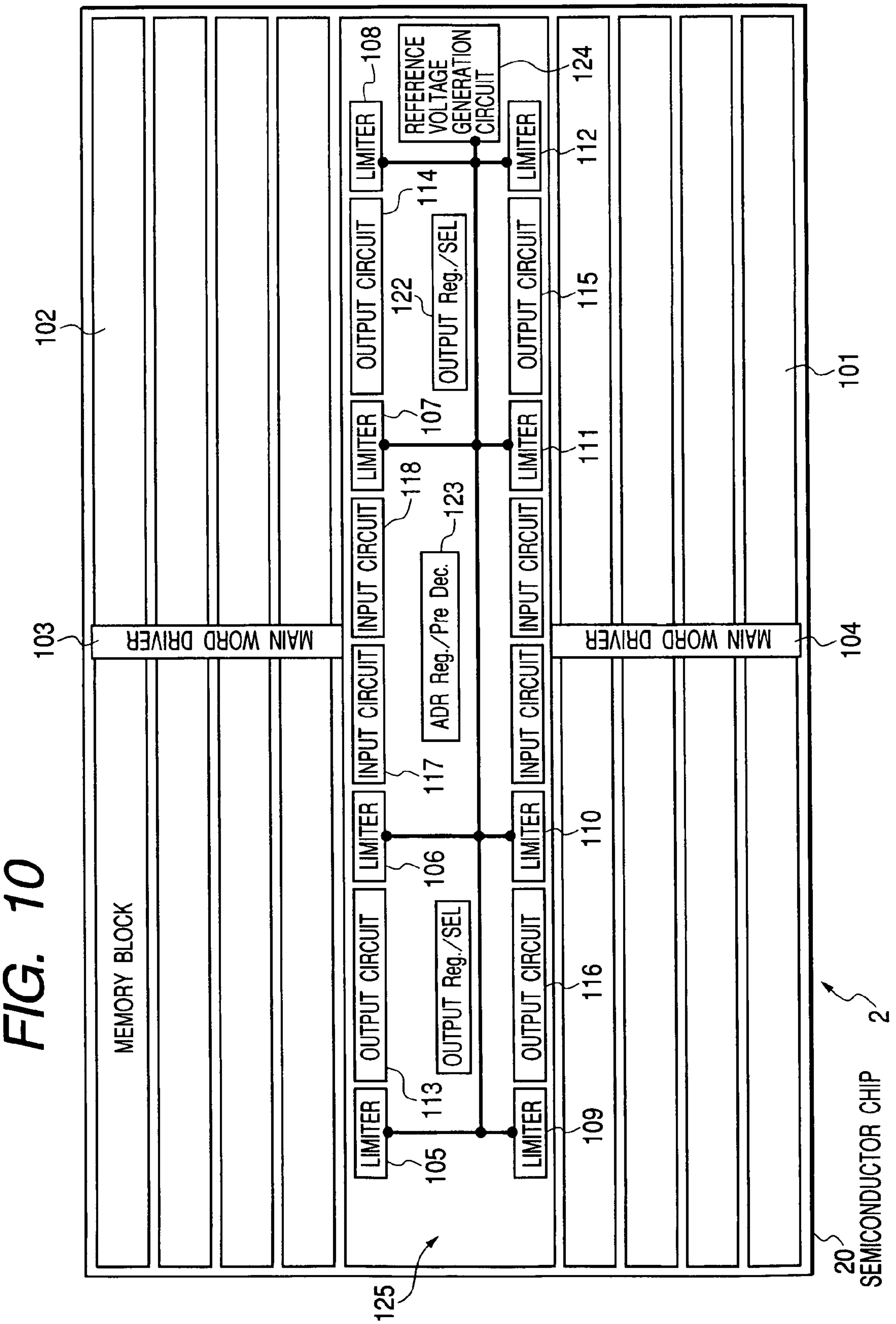
FIG. 10 illustrates an explanatory configuration of the limiter circuit illustrated in FIG. 1.

FIG. 10 illustrates an SRAM (Static Random Access Memory) as an example of the semiconductor integrated circuit device according to the invention.

The SRAM 2 is assumed to be a flip-chip type, which is not limited to this. The SRAM 2 has a BGA (Ball Grid Array) substrate connected on a semiconductor chip 20. The semiconductor chip 20 is formed on a semiconductor substrate such as a single crystal silicon substrate by means of the known production technique for the semiconductor integrated circuit.

The BGA substrate has the BGA balls as the external terminals that permit electrical connections to a component mounting board and so forth. The semiconductor chip 20 and the BGA substrate are electrically connected by way of bump electrodes.

The semiconductor chip 20 has memory cell arrays 101, 102 formed with two partitions divided in the latitudinal direction. A central circuit area 125 is allocated between the memory cell arrays 101, 102. The memory cell arrays 101, 102 have plural static memory cells disposed in array.

In the longitudinal central area of the memory cell arrays 101, 102 are located word drivers 103, 104 that drive word lines for corresponding memory cell arrays.

The central circuit area 125 includes limiter circuits 105 through 112 that generate the internal supply voltage VDDI, output circuits (DQ) 113 thorough 116 that enable outputting data, input circuits 117 through 120 that enable fetching address signals, output registers and selectors (Reg./SEL) 121, 122 that temporarily hold output data and selectively output the data, an address register and pre-decoder (ADR Reg./Pre Dec) 123 that temporarily holds addresses and pre-decodes them, and a reference voltage generation circuit 124 that generates the reference voltage, etc.

In this example, the eight limiter circuits 105 through 112 are located dispersedly in the central circuit area 125 in order to avoid a concentration of current in a circuit element and a wiring. The eight limiter circuits 105 through 112 take partial charge of the power supply to the internal circuits, which lightens the load for one limiter circuit. The limiter circuits 105 through 112 each let down the high supply voltage VDD individually supplied on the basis of the reference voltage VREF from the reference voltage generation circuit 124 to thereby generate the internal supply voltage VDDI. When the high supply voltage VDD takes 2.5 volts, the internal supply voltage VDDI is usually set to 1.2 volts, which is not restricted. In order to reduce the chip size, the plural limiter circuits 105 through 112 share the reference voltage generation circuit 124.

The limiter circuits 105 through 112 are the example of the power supply circuit in the present invention.

Figure 11:
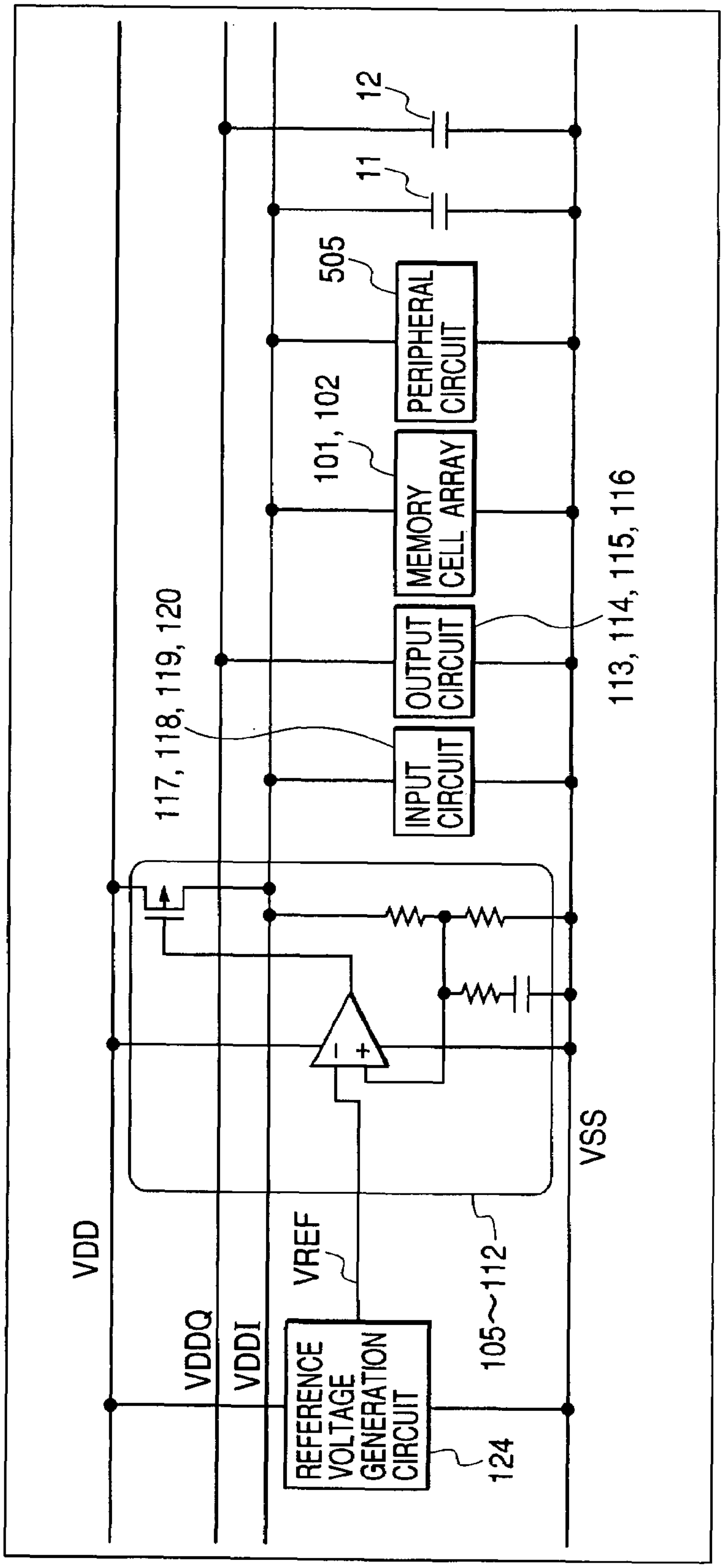
FIG. 11 illustrates a relation between the limiter circuit and the circuits connected thereto.

FIG. 11 illustrates the limiter circuits 105 through 112 and the relation between the circuits connected thereto.

The limiter circuits 105 through 112 assume one and the same configuration, and each bring down the high supply voltage VDD on the basis of the reference voltage VREF to thereby create the internal supply voltage VDDI. The internal supply voltage VDDI created by the limiter circuits 105 through 112 is transmitted to the corresponding internal circuits. The internal circuits that operate on the supply of the internal supply voltage VDDI include, for example, the input circuits 117 through 120, the memory cell arrays 101, 102, and a peripheral circuit 505. The peripheral circuit 505 includes the output registers and selectors (Reg./SEL) 121, 122, the address register and pre-decoder (ADR Reg./Pre Dec) 123, and so forth. It is preferred that the internal supply voltage VDDI be supplied to the concerned internal circuits from the limiter circuit that is located nearest to the concerned internal circuits, in order to reduce the voltage drop by the supply path as much as possible.

The output circuits 113 through 116 are supplied with a high supply voltage VDDQ from the outside. Although not especially restricted, the high supply voltage VDDQ is specified as 1.5 volts.

A VDDI-VSS across capacitor 11 is formed to bridge the internal supply voltage VDDI and the low supply voltage VSS, and a VDDQ-VSS across capacitor 12 is formed to bridge the high supply voltage VDDQ and the low supply voltage VSS.

Figure 1:
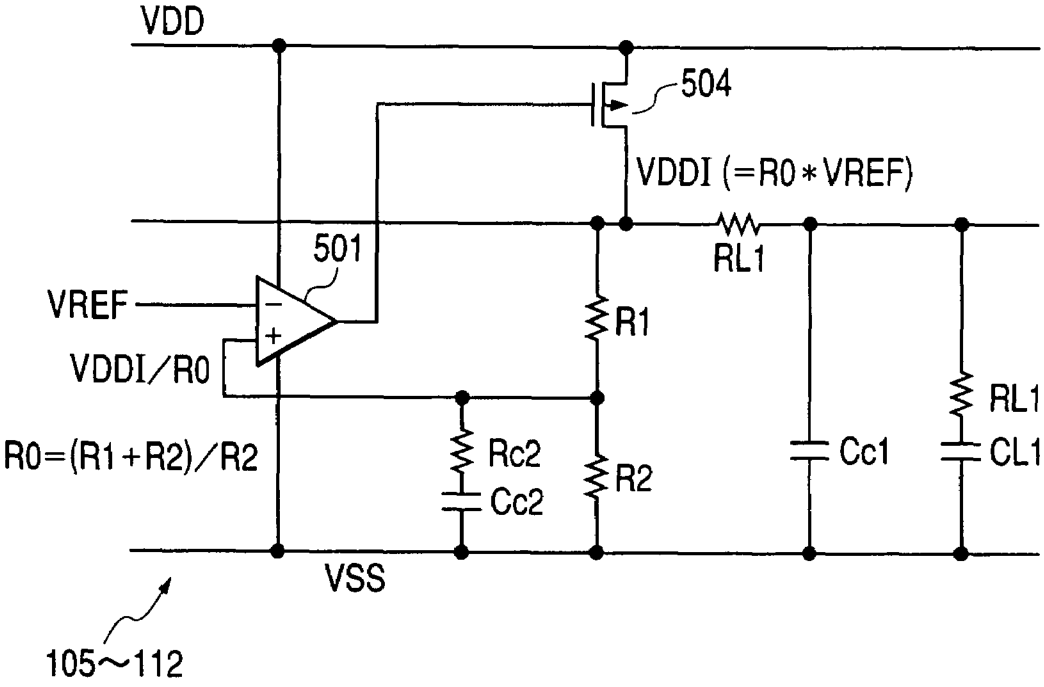
FIG. 1 illustrates a limiter circuit contained in an SRAM being an example of a semiconductor integrated circuit device according to the present invention.

FIG. 1 illustrates an example of the limiter circuits 105 through 112.

The limiter circuit is provided with a differential amplifier 501, and at the post stage thereof, a p-channel MOS transistor 504 that is driven and controlled by the output signal from the differential amplifier 501. The p-channel MOS transistor 504 brings down the high supply voltage VDD to create the internal supply voltage VDDI on the basis of the output signal from the differential amplifier 501. A series circuit of resistors R1 and R2 is provided between the drain electrode of the p-channel MOS transistor 504 and the low supply voltage VSS. The voltage variations of the internal supply voltage VDDI are detected through the series circuit of the resistors R1 and R2. The voltage variations of the internal supply voltage VDDI are acquired from the node of the resistors R1 and R2 in series connection. The node of the resistors R1 and R2 in series connection is connected to the non-inverted input terminal of the differential amplifier 501. The inverted input terminal of the differential amplifier 501 is supplied with the reference voltage VREF. The amplification factor R0 of the differential amplifier 501 is calculated from the relation of the resistors R1, R2, as follows.

$$R0=(R1+R2)/R2$$

The differential amplifier 501 compares the voltage (VDDI/R0) generated at the node of the resistors R1 and R2 in series connection with the reference voltage VREF, and controls the operation of the p-channel MOS transistor 504 on the basis of the comparison result. The internal supply voltage VDDI acquired by the p-channel MOS transistor 504 is given by the following expression.

$$\mathrm{VDDI}=R0\times\mathrm{VREF}$$

When the level of the internal supply voltage VDDI is varied with the variation of the load, the variation is detected through the series circuit of the resistors R1 and R2, which is transmitted to the differential amplifier 501. If the divided voltage level by the resistors R1 and R2 is lower than the reference voltage VREF, the output signal from the differential amplifier 501 lowers the ON-resistance of the p-channel MOS transistor 504, which raises the level of the internal supply voltage VDDI. And, if the divided voltage level by the resistors R1 and R2 is higher than the reference voltage VREF, the output signal from the differential amplifier 501 raises the ON-resistance of the p-channel MOS transistor 504, which lowers the level of the internal supply voltage VDDI. Such a feedback control stabilizes the level of the internal supply voltage VDDI.

For the phase compensation, the limiter circuit is provided with phase compensating capacitors Cc1, Cc2, and a phase compensating resistor Rc2. The phase compensating capacitor Cc1 is provided between the output terminal of the p-channel MOS transistor 504 and the low supply voltage VSS. The capacitor Cc1 together with a wiring resistor RL1 conducts the phase compensation by the pole/zero compensation system. The phase compensating resistor Rc2 and the phase compensating capacitor Cc2 are connected in series between the non-inverted input terminal of the differential amplifier 501 and the low supply voltage VSS. This circuit configuration is one of the characteristic points of the limiter circuits 105 through 112.

The RL1 is a load resistor, and CL1 is a load capacitor.

Now, the phase compensation will be described in detail.

Figure 2:
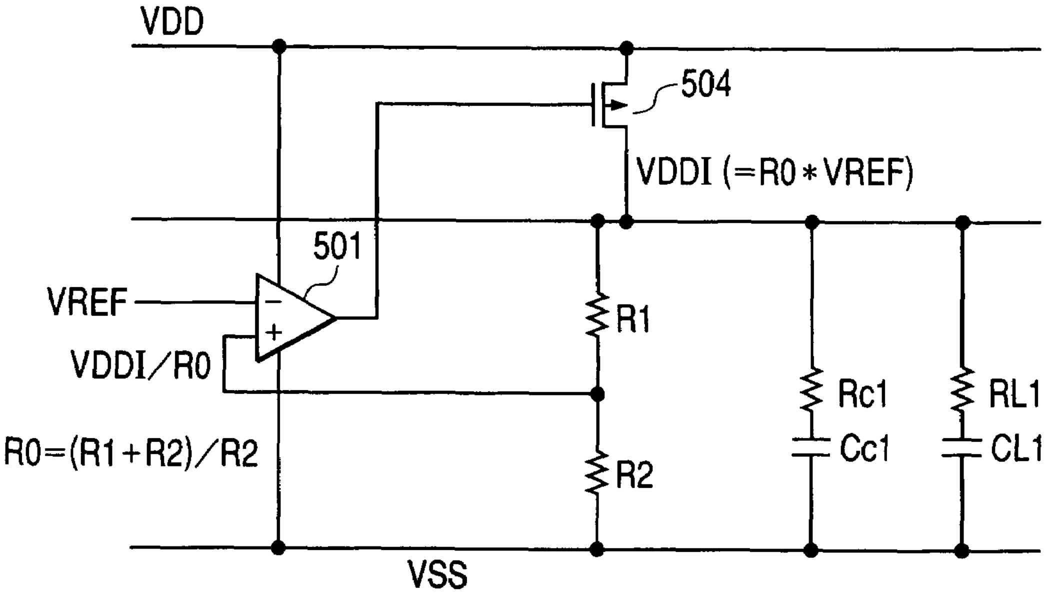
FIG. 2 illustrates a circuit compared with the limiter circuit illustrated in FIG. 1.
Figure 3:
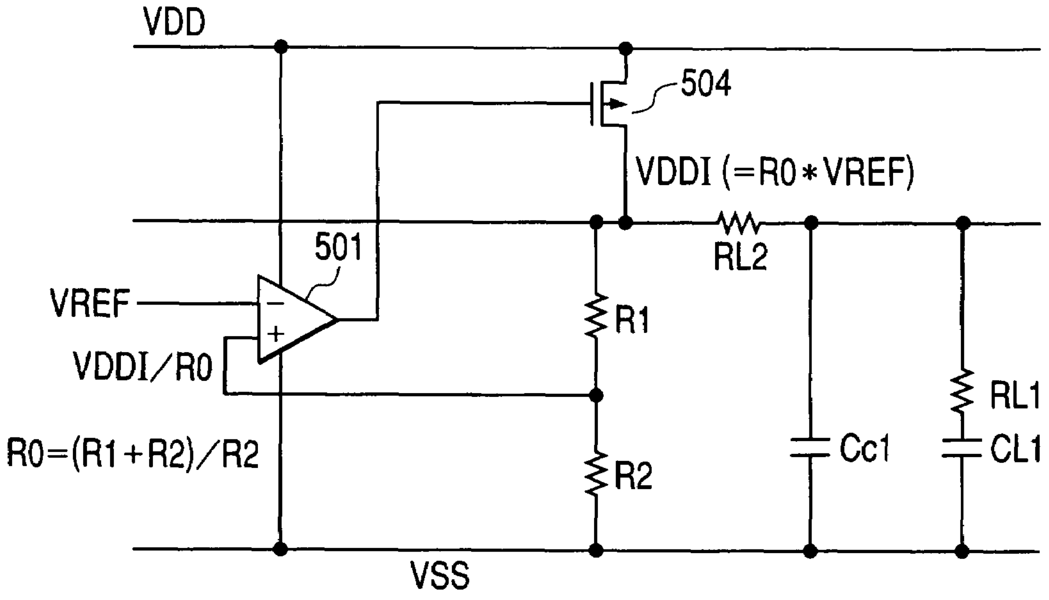
FIG. 3 illustrates a circuit compared with the limiter circuit illustrated in FIG. 1.

FIG. 2 illustrates a circuit that is compared with the limiter circuit illustrated in FIG. 1, and FIG. 3 illustrates the same kind.

The circuit illustrated in FIG. 2 connects the series circuit of the phase compensating resistor Rc1 and the phase compensating capacitor Cc1 between the internal supply voltage VDDI and the low supply voltage VSS, and thereby performs the phase compensation.

The circuit illustrated in FIG. 3 utilizes the wiring resistor RL2 of the internal supply voltage VDDI for the phase compensation. The wiring resistor RL2 functions in the same manner as the phase compensating resistor Rc1 in FIG. 1. This method is effective when the condition does not allow the series connection of the phase compensating resistor Rc1 to the phase compensating capacitor Cc1.

In order to enhance the current supply capability, a MOS transistor with a short gate length is preferably adopted as the p-channel MOS transistor 504.

Figure 5:
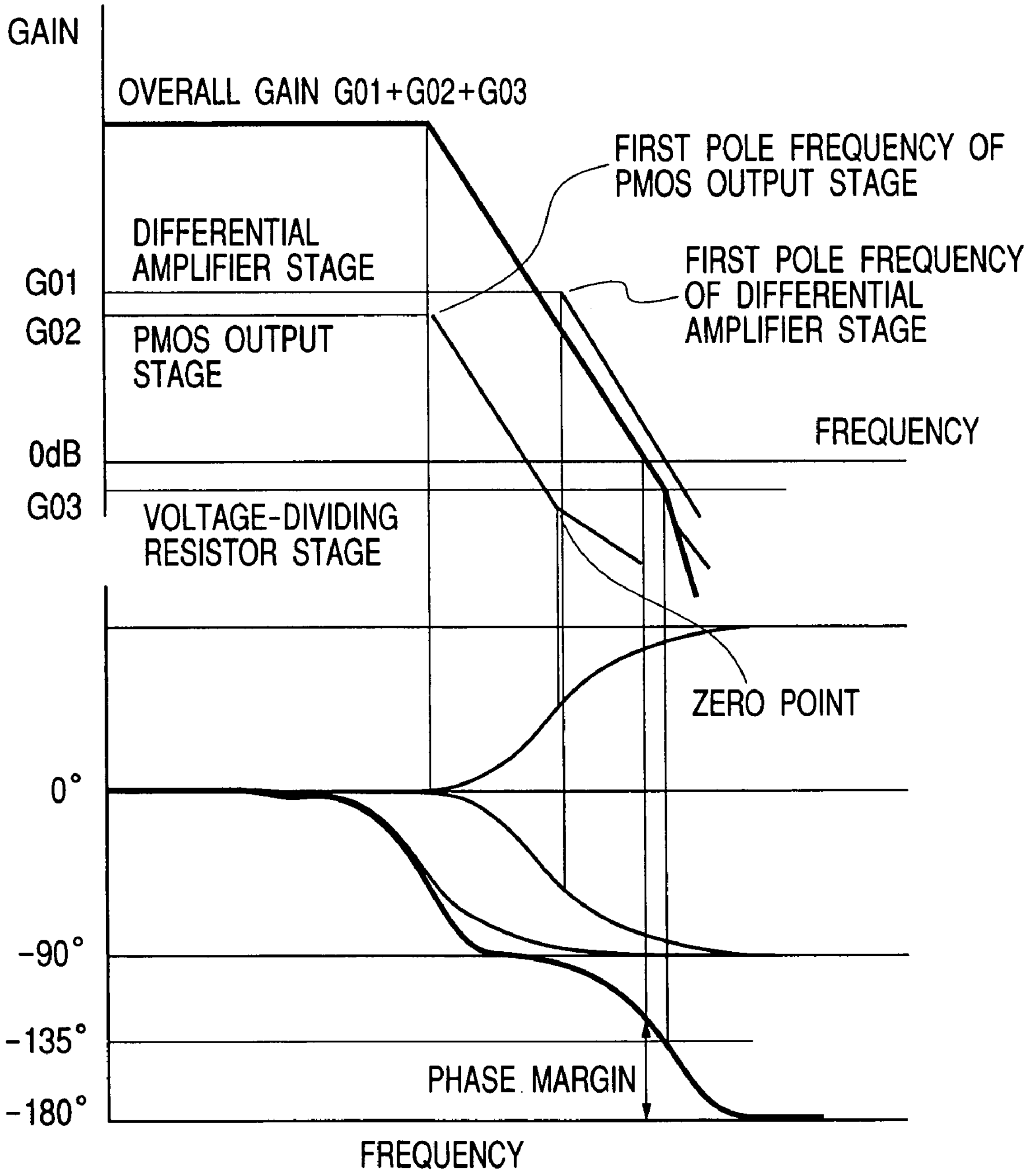
FIG. 5 illustrates a Bode diagram for the general phase compensation.

FIG. 5 illustrates a Bode diagram in the general pole/zero compensation. Here in the Bode diagram, the voltage-dividing resistor stage denotes the resistors R1 and R2, the PMOS output stage denotes the p-channel MOS transistor 504, and the differential amplifier stage denotes the differential amplifier 501. The symbols G01, G02, and G03 signify the gain of the differential amplifier stage, the gain of the PMOS output stage, and the gain of the voltage-dividing resistor stage, respectively.

Figure 4:
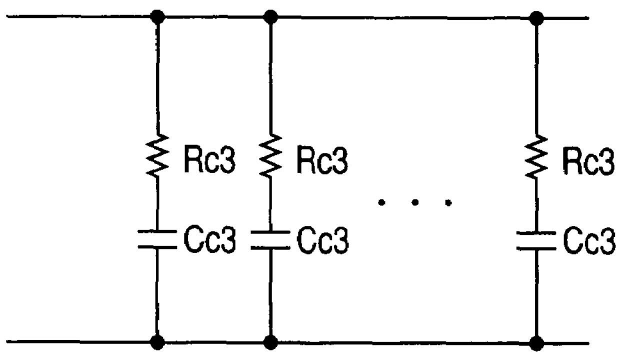
FIG. 4 illustrates a circuit explaining the relation between the phase compensating resistor and the phase compensating capacitor.
Figure 6:
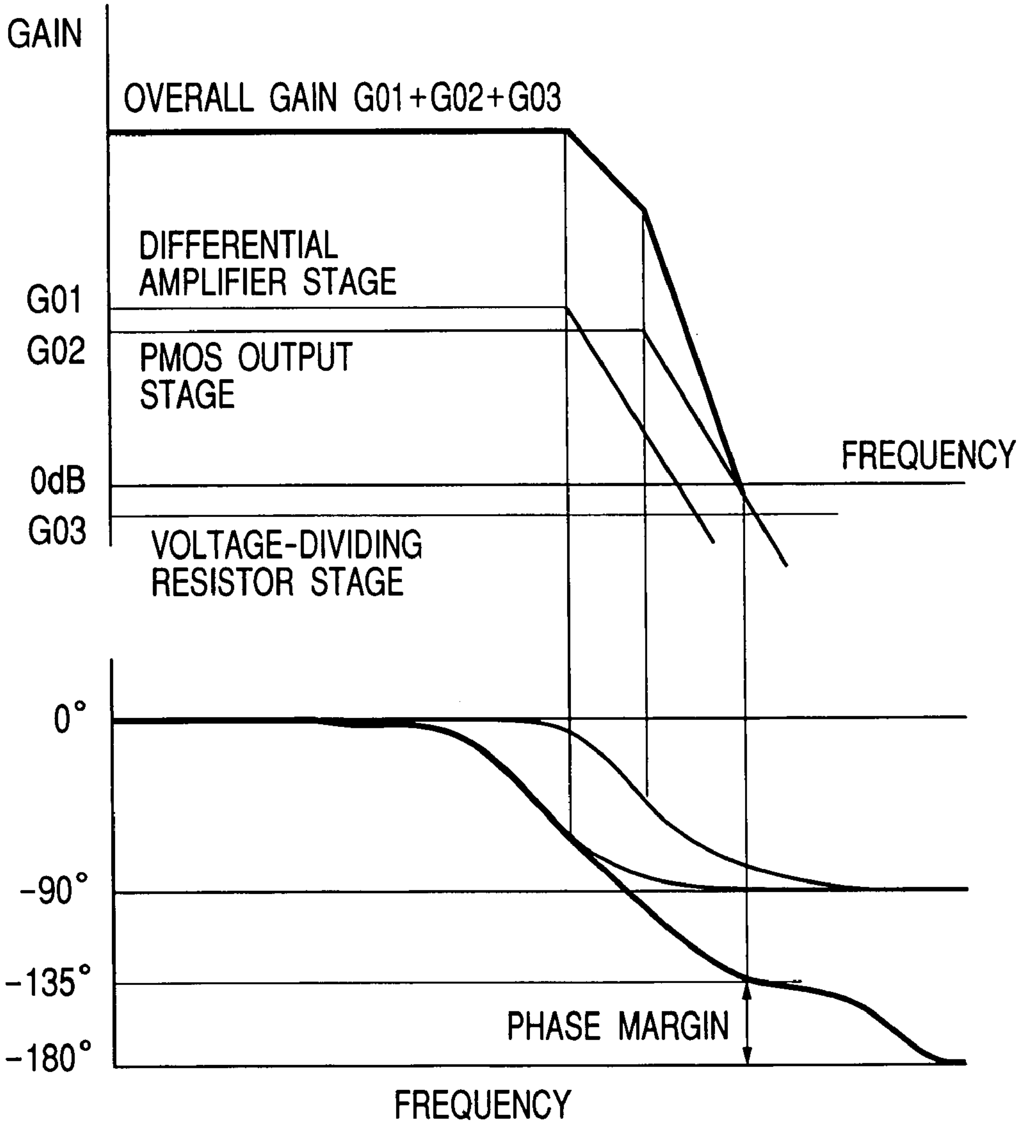
FIG. 6 illustrates a Bode diagram for the phase compensation in the circuit illustrated in FIG. 3.

As FIG. 5 illustrates the relation between the gain of the differential amplifier stage and the gain of the output stage of the p-channel MOS transistor 504, the pole/zero compensation system is effective when the first pole frequency of the driver PMOS output stage is located in a lower frequency than the first pole frequency of the differential amplifier stage. The pole/zero compensation system shifts the first pole frequency of the p-channel MOS transistor 504 to a further lower frequency by the series circuit of the phase compensating resistor Rc1 and phase compensating capacitor Cc1 in FIG. 2, cancels the first pole frequency of the differential amplifier stage by the zero point, and thereby reduces the phase delay to secure the phase margin. However, as the drain conductance of the p-channel MOS transistor 504 decreases, the first pole frequency of the p-channel MOS transistor 504 shifts to a higher frequency, which consequently brings about the relation shown in FIG. 6. In this case, if it is intended to shift the first pole frequency of the p-channel MOS transistor 504 to a lower frequency than the first pole frequency of the differential amplifier stage by means of only the pole/zero compensation system, a considerably large capacitance is required for the phase compensating capacitor Cc1. To attain a large capacitance necessitates parallel connections by many capacitors Cc3, as shown in FIG. 4, which increases the chip occupancy area for the phase compensating capacitor. Here in this case, the phase compensating resistors Rc3 connected in series to the individual phase compensating capacitors Cc3 are mutually connected in parallel to thereby lower the composite resistance, which hinders appropriate phase compensation. When more capacitors Cc3 are accordingly connected in parallel, the phase compensating resistors Rc3 connected in series to the individual phase compensating capacitors Cc3 have to use resistors having still higher resistances. As the resistance becomes higher, the chip occupancy area for the phase compensating resistor will necessarily be increased to that extent.

In this manner, when the drain conductance of the p-channel MOS transistor 504 is low, it is unavoidable that the chip occupancy area for the phase compensating capacitor and the phase compensating resistor by the pole/zero compensation system becomes large. However, there is practically a certain limit in the occupancy area for the phase compensating capacitor and the phase compensating resistor from the restriction of the chip size, which makes it difficult to attain a sufficient phase margin.

And, when the wiring resistor RL2 is used as the phase compensating resistor, as shown in FIG. 3, it is almost impossible to increase the resistance of the wiring resistor RL2 in view of enhancing the current supply capability; accordingly, it becomes difficult to secure a sufficient phase margin.

In contrast to this, the circuit configuration in FIG. 1 is provided with the series connection circuit of the phase compensating resistor Rc2 and the phase compensating capacitor Cc2 between the non-inverted input terminal of the differential amplifier 501 and the low supply voltage VSS, which carries out the phase compensation by the phase compensating resistor Rc2 and the phase compensating capacitor Cc2 in addition to the phase compensation by the wiring resistor RL1 and the phase compensating capacitor Cc1.

Figure 7:
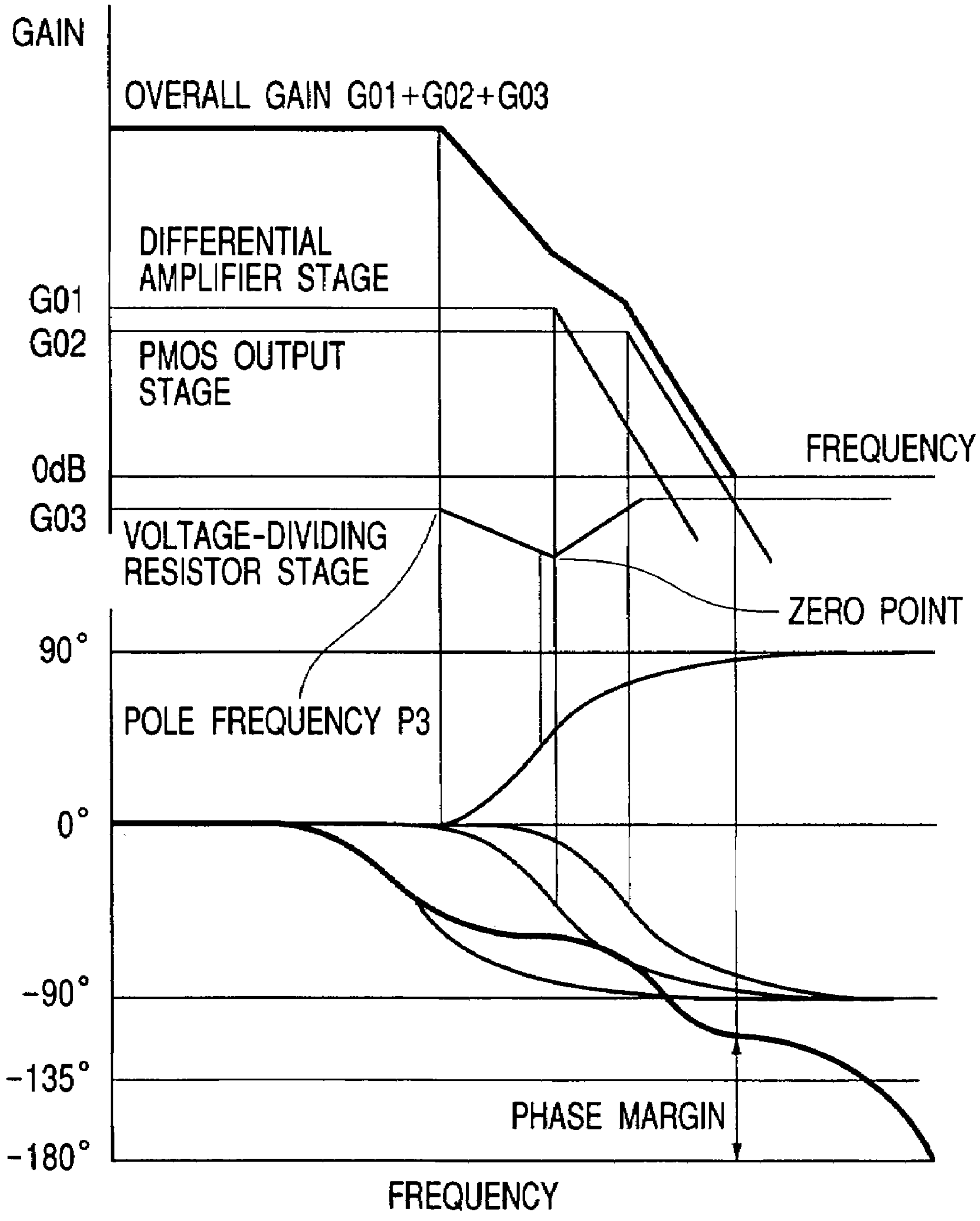
FIG. 7 illustrates a Bode diagram for the phase compensation in the circuit illustrated in FIG. 1.

FIG. 7 illustrates a Bode diagram for the phase compensation in the circuit illustrated in FIG. 1.

Since the circuit is provided with the series connection circuit of the phase compensating resistor Rc2 and the phase compensating capacitor Cc2 between the non-inverted input terminal of the differential amplifier 501 and the low supply voltage VSS, in the Bode diagram in FIG. 7, the voltage-dividing resistor stage newly bears a pole frequency P3 and a zero point that are created by the phase compensating resistor Rc2 and the phase compensating capacitor Cc2. As the result, the first pole frequency in the overall gain is determined by the first pole frequency P3 in the voltage-dividing resistor stage, and is shifted to a lower frequency. The zero point cancels the first pole frequency in the differential amplifier stage to thereby reduce the phase delay, thus securing the phase margin.

In the circuit configuration in FIG. 2, the first pole frequency in the PMOS output stage illustrated in FIG. 5 is given by the expression that is proportional to the inverse number of the product of the output resistance of the p-channel MOS transistor 504 and (Cc1+CL1). However, in order to attain a high drive current, the limiter circuit is needed to reduce the output resistance of the p-channel MOS transistor 504. Accordingly, to attain the pole frequency of some MHz, for example, the capacitance of the phase compensating capacitor Cc1 is needed to increase. In contrast to this, in the circuit configuration in FIG. 1, the pole frequency P3 in FIG. 7 is given by the expression that is proportional to the inverse number of the product of Rc2 and Cc2 in FIG. 1. Therefore, the resistance of the phase compensating resistor Rc2 can separately be set from the output resistance of the p-channel MOS transistor 504. Accordingly, a considerably high resistance can be selected for the phase compensating resistor Rc2. Since the phase compensating resistor Rc2 can take a considerably high resistance, the phase compensating capacitor Cc2 can select a low capacitance to attain the same characteristic. Therefore, the phase compensating resistor Rc2 and the phase compensating capacitor Cc2 can be implemented by a smaller size than the phase compensating resistor Rc1 and the phase compensating capacitor Cc1 for executing the pole/zero compensation. The resistance of the metal wiring for the internal supply voltage VDDI can be reduced without considering the phase margin of the limiter circuits 105 through 112, and the stable operation of the limiter circuits 105 through 112 can be attained accordingly. And, the circuit is allowed to take on a MOS with a short gate length as the p-channel MOS transistor 504 without apprehension of the drain conductance, which makes it possible to form a limiter circuit suitable for a chip that consumes a considerably high current.

Figure 8:
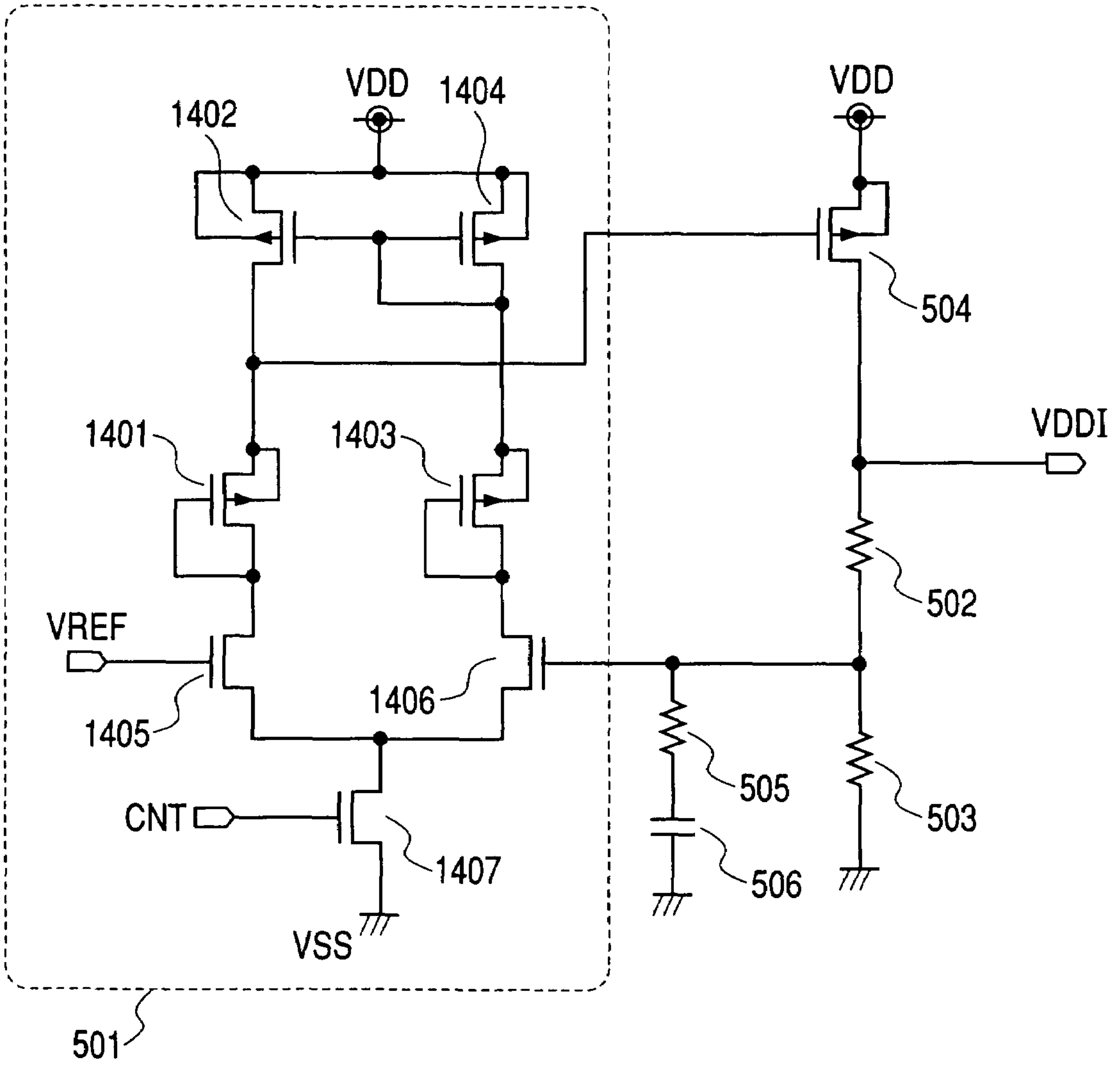
FIG. 8 illustrates a circuit of a differential amplifier applicable to the limiter circuit illustrated in FIG. 1.

FIG. 8 illustrates the circuit configuration of the differential amplifier 501.

The differential amplifier 501 is configured in a state that p-channel MOS transistors 1401, 1402, 1403, and 1404, and n-channel MOS transistors 1405, 1406, and 1407 are connected as shown in FIG. 8. The n-channel MOS transistors 1405, 1406 form a differential connection by connecting the source electrodes thereof to the low supply voltage VSS through the n-channel MOS transistor 1407. The n-channel MOS transistor 1407 functions as a constant current source by a predetermined control voltage being supplied to the gate electrode thereof.

The drain electrode of the n-channel MOS transistor 1405 is connected to the high supply voltage VDD through the p-channel MOS transistors 1401, 1402. The drain electrode of the n-channel MOS transistor 1406 is connected to the high supply voltage VDD through the p-channel MOS transistors 1403, 1404.

The p-channel MOS transistors 1402 and 1404 form a current mirror connection, so that the n-channel MOS transistors 1405 and 1406 (differential pair) form a current mirror type load.

The gate electrode of the n-channel MOS transistor 1405 receives the reference voltage VREF from the reference voltage generation circuit 124. The gate electrode of the n-channel MOS transistor 1406 receives a divided voltage of the internal supply voltage VDDI by resistors 502, 503. From the series connection node of the p-channel MOS transistors 1401, 1402 is acquired an output signal of the differential amplifier 501, which is transmitted to the gate electrode of the p-channel MOS transistor 504.

Figure 9:
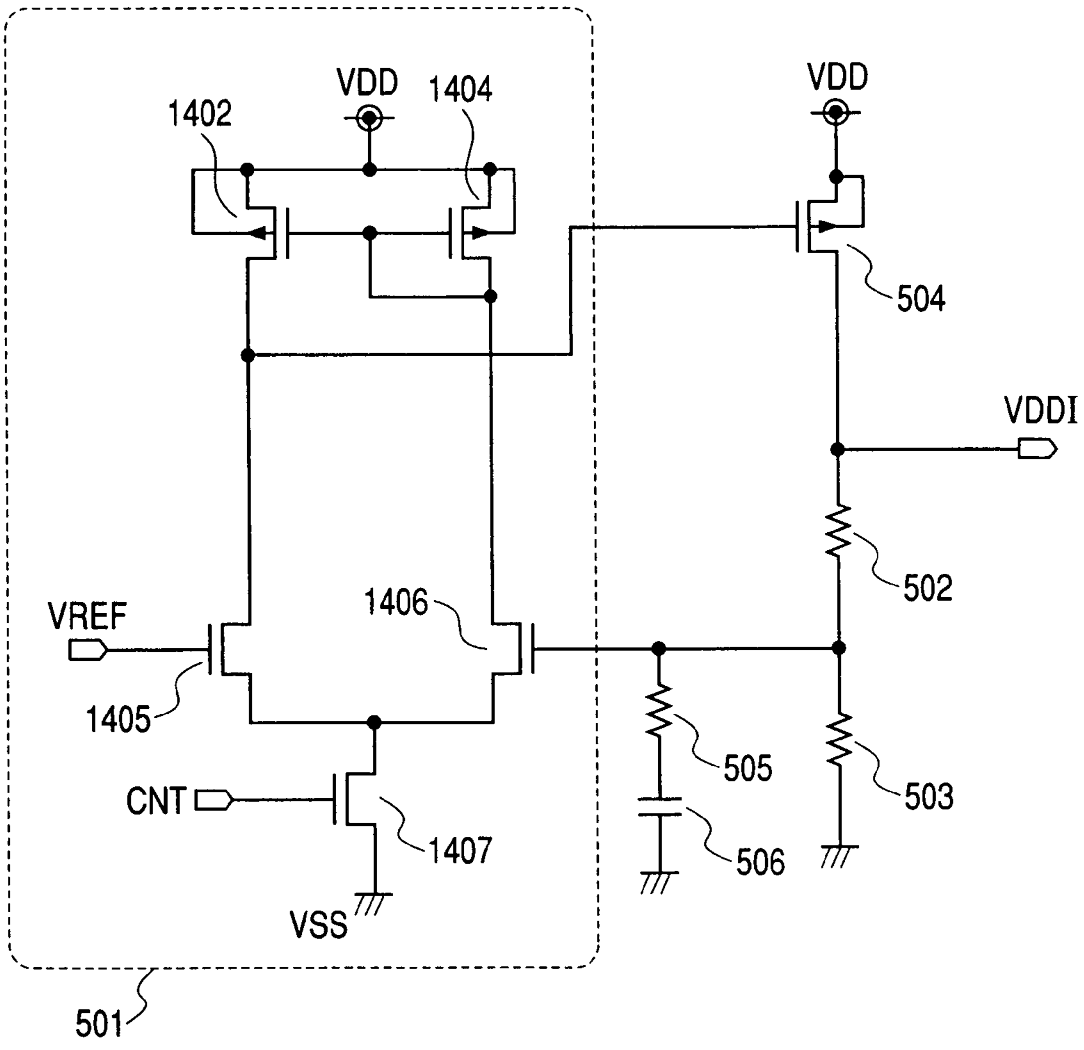
FIG. 9 illustrates another circuit of the differential amplifier applicable to the limiter circuit illustrated in FIG. 1.

The p-channel MOS transistors 1401, 1403 are provided to relieve the withstanding voltage, when the differential amplifier is formed with the MOS transistors whose gate withstanding voltage is lower than the voltage level of the high supply voltage VDD. Therefore, if the gate withstanding voltage of the MOS transistors forming the differential amplifier is higher than the voltage level of the high supply voltage VDD, the p-channel MOS transistors 1401, 1403 may be omitted. FIG. 9 illustrates the circuit in that case.

Figure 24:
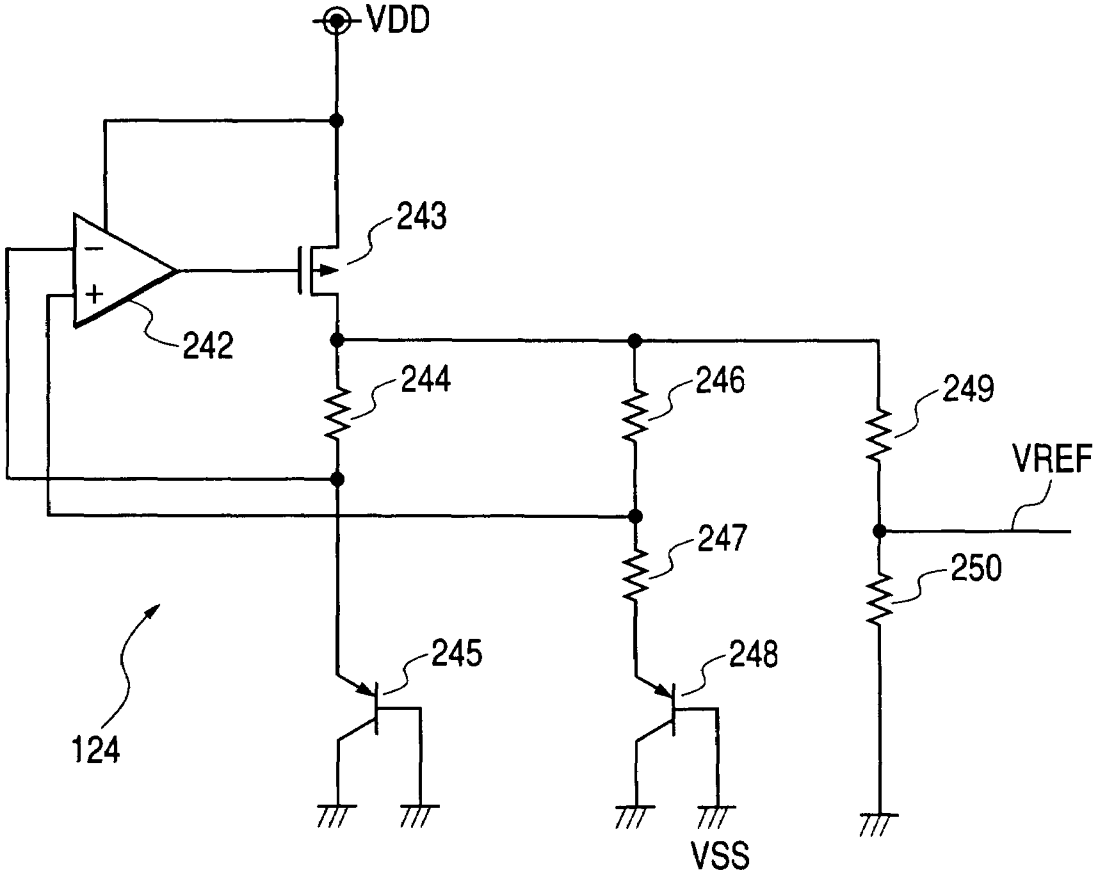
FIG. 24 illustrates a reference voltage generation circuit that generates the reference voltage used in the limiter circuit.

FIG. 24 illustrates a reference voltage generation circuit that generates the reference voltage VREF.

The reference voltage generation circuit includes a differential amplifier 242, and a p-channel MOS transistor 243 located at the post-stage of the differential amplifier 242; and the differential amplifier 242 is designed to drive and control the p-channel MOS transistor 243. The source electrode of the p-channel MOS transistor 243 is connected to the high supply voltage VDD. The circuit also includes, between the drain electrode of the p-channel MOS transistor 243 and the low supply voltage VSS, a series connection circuit of a resistor 244 and a bipolar transistor 245, a series connection circuit of resistors 246, 247 and a bipolar transistor 248, and a series connection circuit of resistors 249, 250. The series connection node of the resistor 244 and the bipolar transistor 245 is connected to the inverted input terminal of the differential amplifier 242, and the series connection node of the resistors 246 and 247 is connected to the non-inverted input terminal of the differential amplifier 242. The differential amplifier 242 compares a voltage taken in through the non-inverted input terminal and a voltage taken in through the inverted input terminal, and drives and controls the p-channel MOS transistor 243 in accordance with the comparison result. Here, the voltage divided by the resistors 249 and 250 is outputted as the reference voltage VREF.

Figure 12:
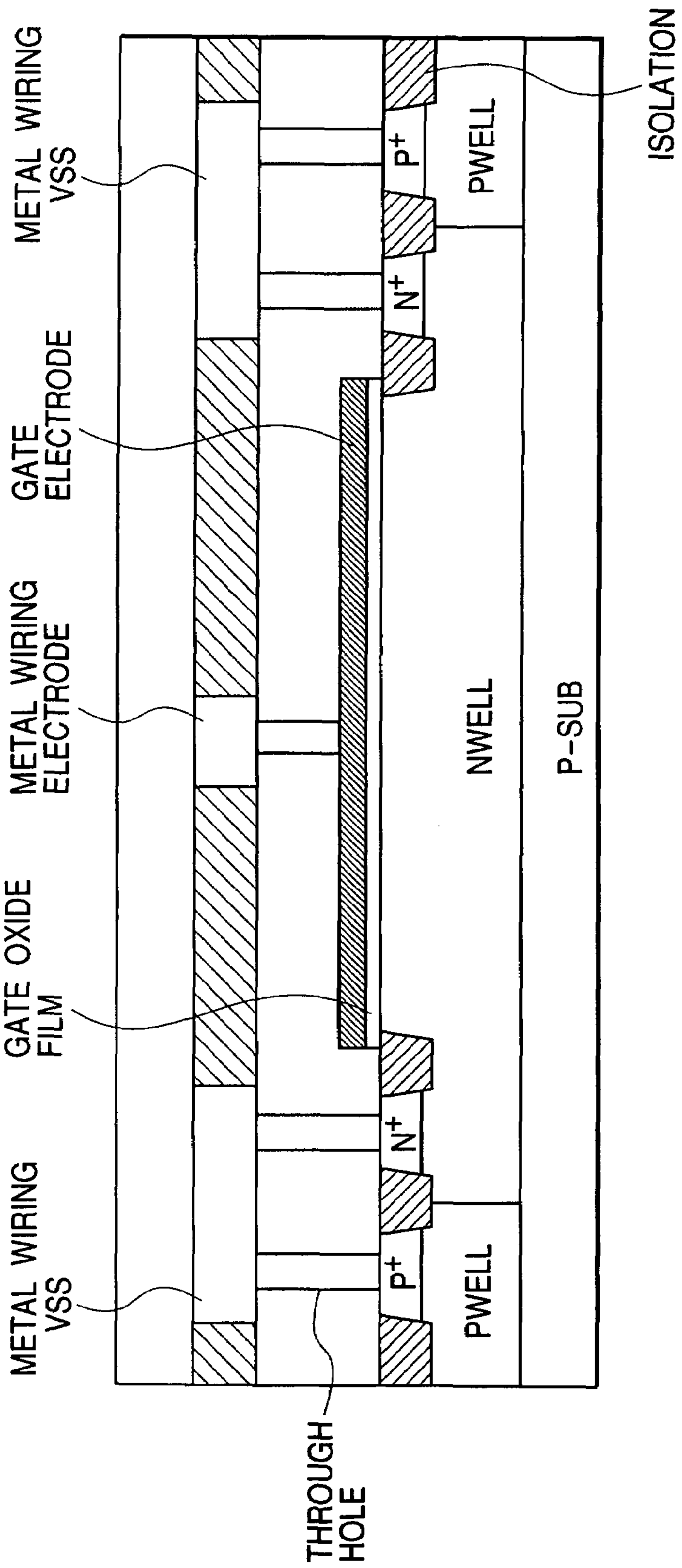
FIG. 12 illustrates a section of a configuration for a phase compensating capacitor contained in the limiter circuit.
Figure 13:
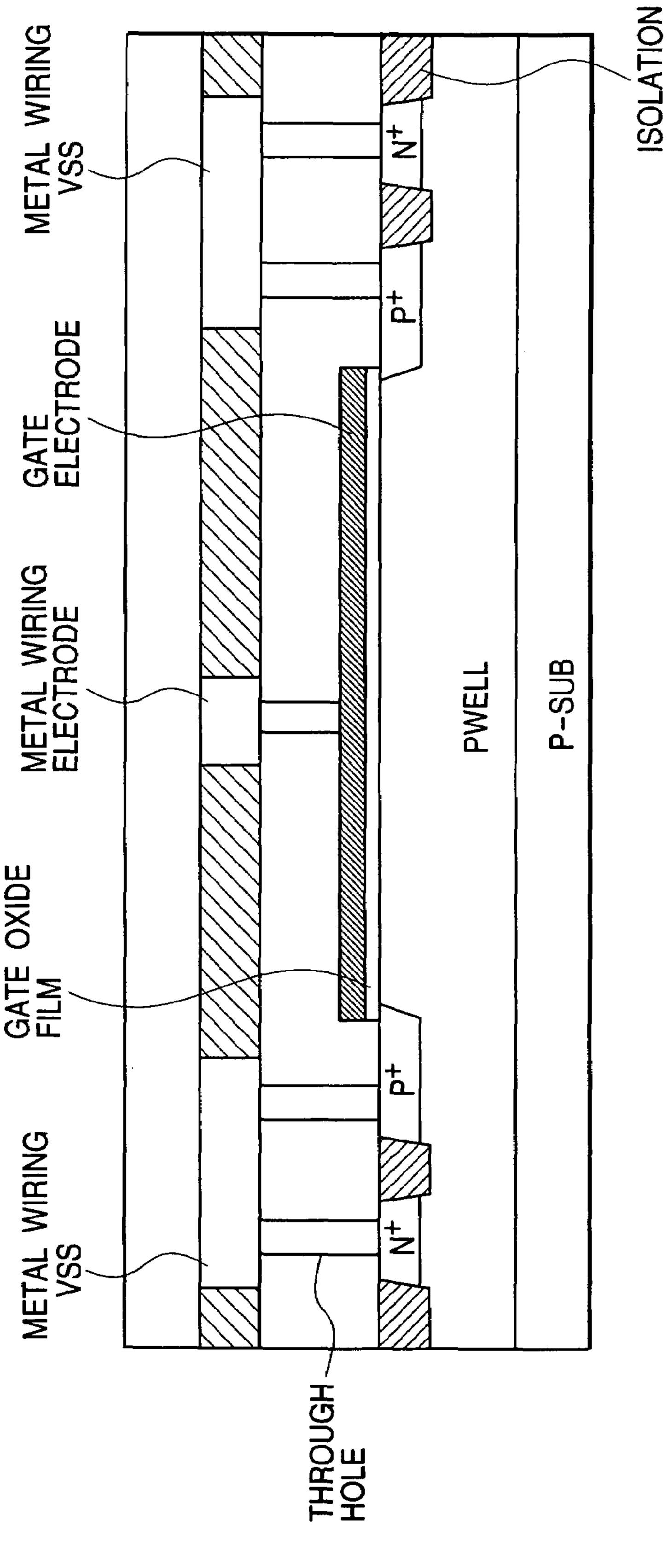
FIG. 13 illustrates a section of another configuration for a phase compensating capacitor contained in the limiter circuit.
Figure 14:
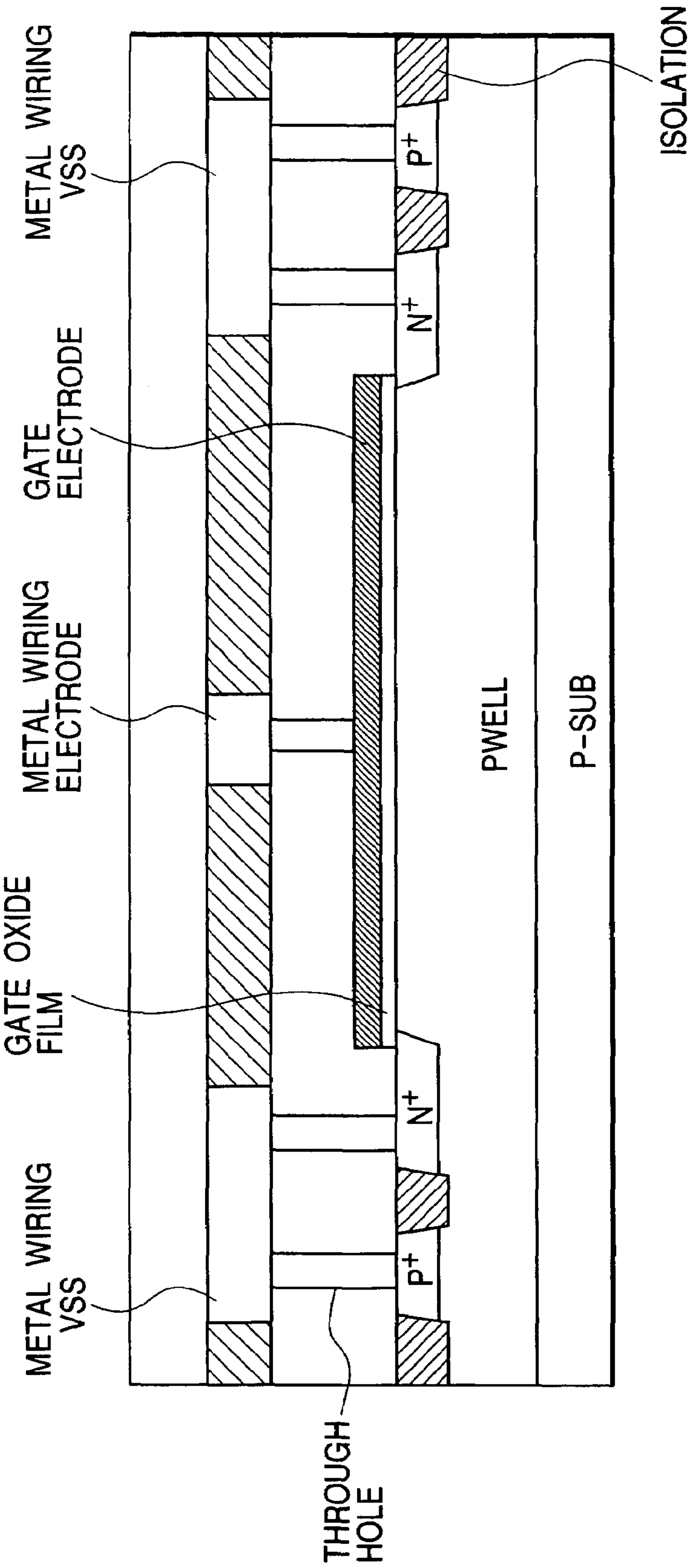
FIG. 14 illustrates a section of another configuration for a phase compensating capacitor contained in the limiter circuit.

The phase compensating capacitor Cc2 can be formed with a gate oxide film being an example of the insulating film for a dielectric as shown in FIG. 12, FIG. 13, and FIG. 14. That is, when the gate electrode is deposited on the gate oxide film, a capacitor is formed between a metal wiring electrode being conductive to the gate electrode by way of a through hole and a metal wiring (VSS) being conductive to a P+ diffusion layer, $N^+$ diffusion layer by way of through holes. This capacitor can be used for the phase compensating capacitor Cc2. In the configuration illustrated in FIG. 12, the $N^+$ diffusion layer is formed in the N Well, and the $P^+$ diffusion layer is formed in the P Well. In the configuration illustrated in FIG. 13, the $N^+$ diffusion layer and the $P^+$ diffusion layer are formed in the N Well. In the configuration illustrated in FIG. 14, the $N^+$ diffusion layer and the $P^+$ diffusion layer are formed in the P Well.

Figure 15:
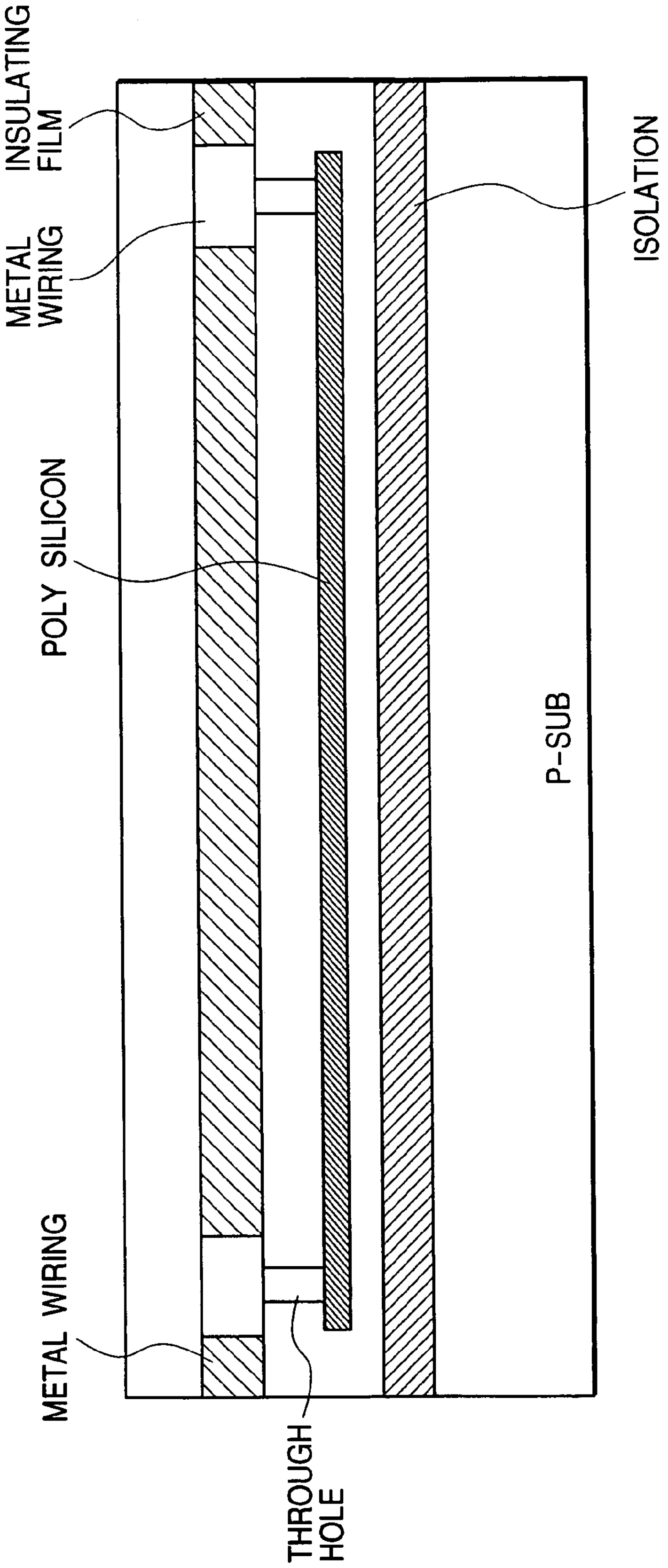
FIG. 15 illustrates a section of a configuration for a phase compensating resistor contained in the limiter circuit.
Figure 16:
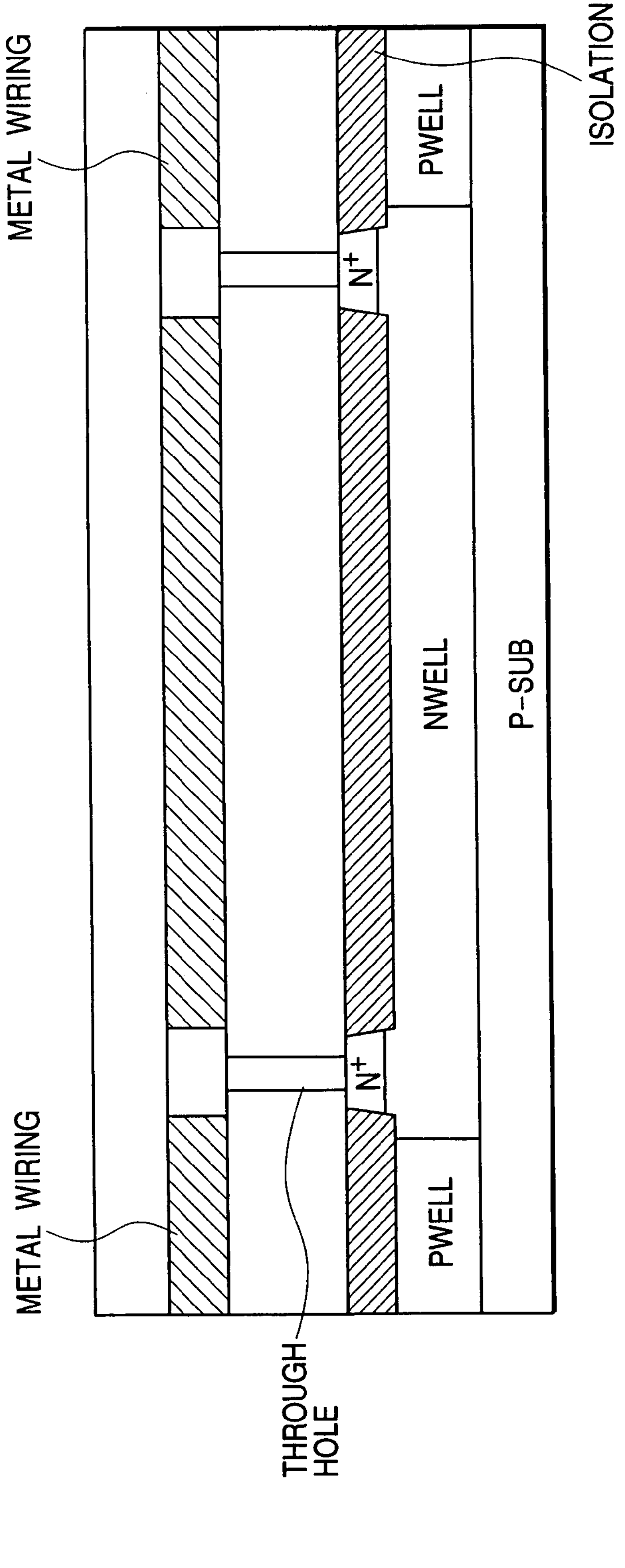
FIG. 16 illustrates a section of another configuration for a phase compensating resistor contained in the limiter circuit.
Figure 17:
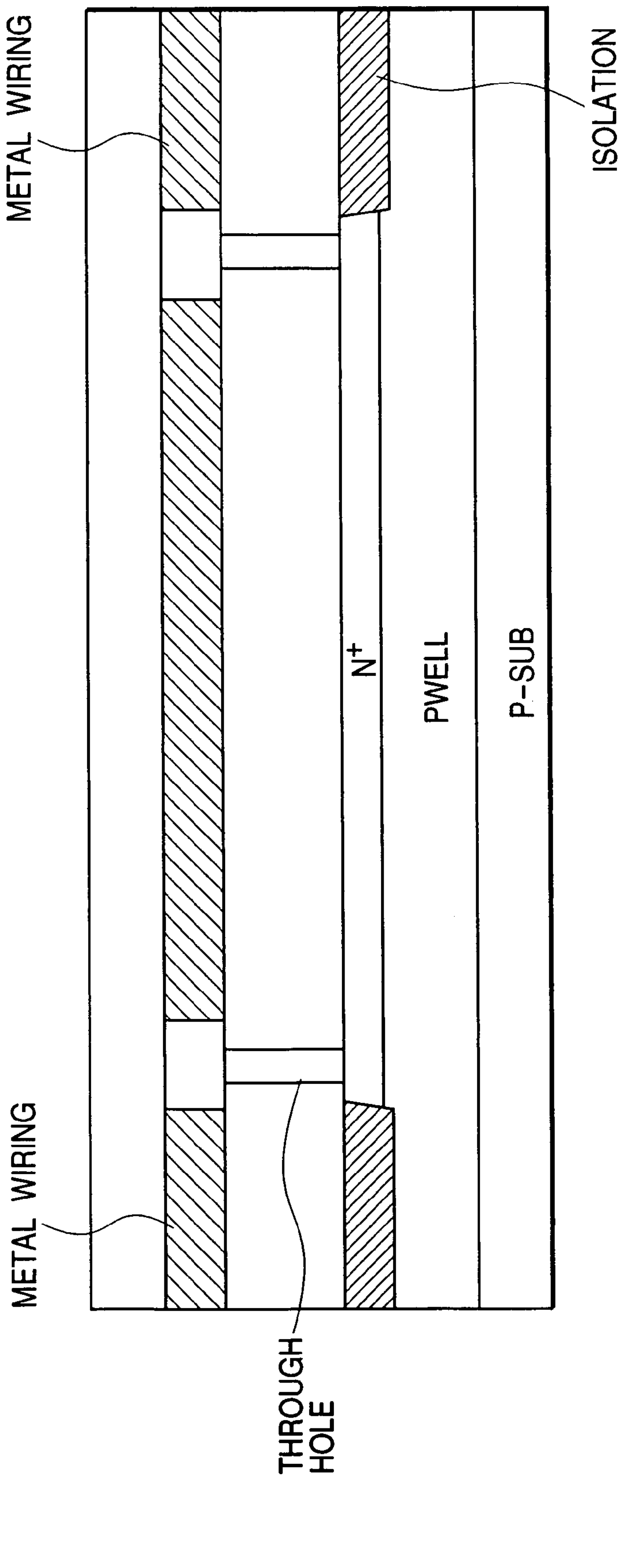
FIG. 17 illustrates a section of another configuration for a phase compensating resistor contained in the limiter circuit.

The phase compensating resistor Rc2 can be formed as shown in FIG. 15, FIG. 16, and FIG. 17. FIG. 15 illustrates a sectional structure of a resistor formed with a poly-silicon layer. To make conductive both ends of the poly-silicon layer to metal wirings by way of through holes will draw out both ends of the resistor. FIG. 16 illustrates a sectional structure of a resistor formed with a diffusion layer. To make conductive the $N^+$ diffusion layers on the N Well to metal wirings by way of through holes will draw out both ends of the resistor. FIG. 17 illustrates a sectional structure of a resistor formed with an $N^+$ diffusion layer on the P Well. To make conductive the $N^+$ diffusion layer on the P Well to metal wirings by way of through holes will draw out both ends of the resistor. In addition, to utilize a resistance existing in the metal wiring will attain the phase compensating resistor Rc2.

Figure 18:
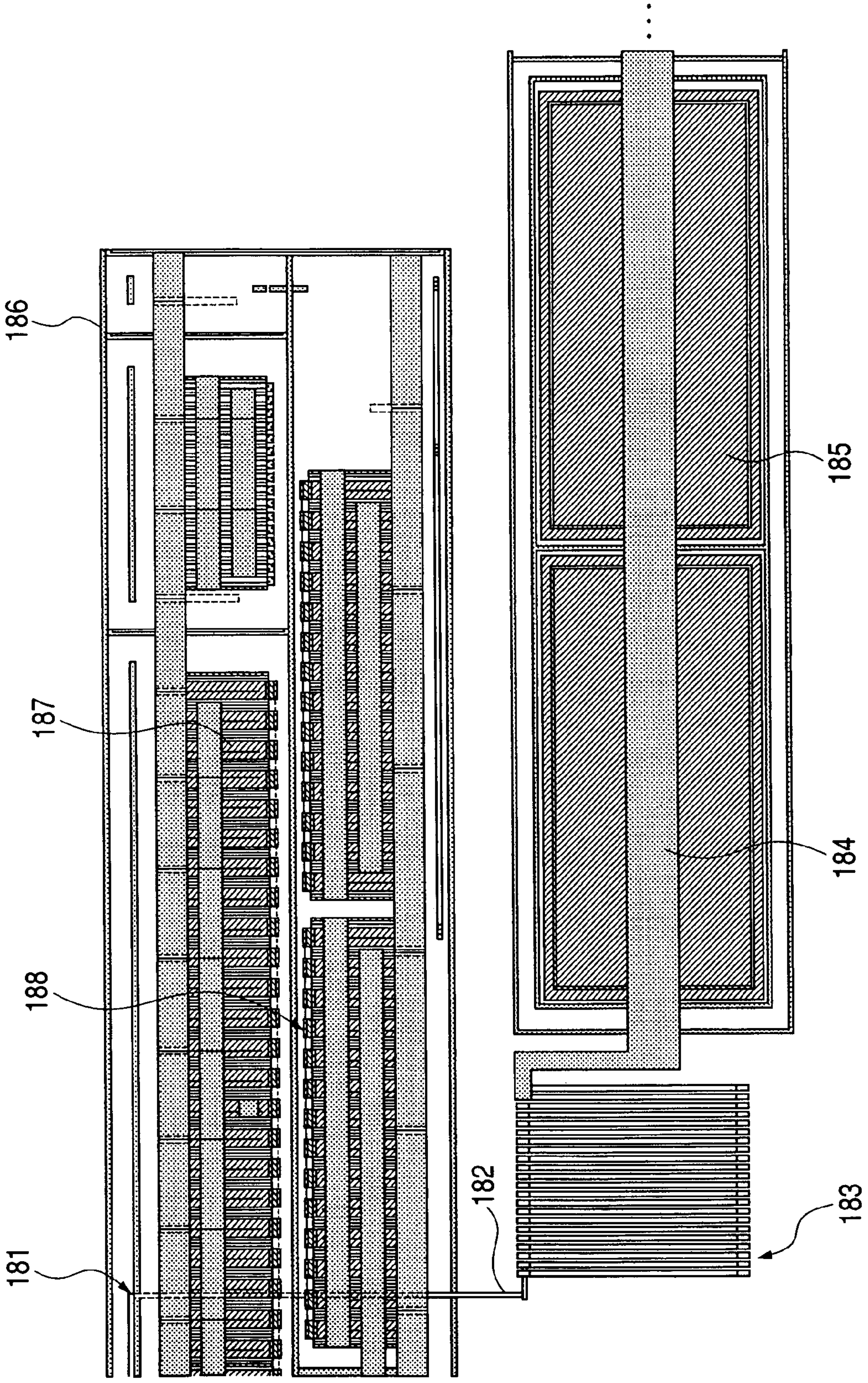
FIG. 18 illustrates a layout for a phase compensating resistor and a phase compensating capacitor contained in the limiter circuit.

FIG. 18 illustrates a layout for the phase compensating resistor Rc2 and the phase compensating capacitor Cc2. The phase compensating resistor Rc2 is formed with a poly-silicon layer in the area illustrated by the numeric symbol 183. The phase compensating capacitor Cc2 is formed with a gate oxide film in the area illustrated by the numeric symbol 185. A metal wiring 184 is formed to bridge the area 183 and the area 185. The metal wiring 184 connects the phase compensating resistor Rc2 and the phase compensating capacitor Cc2. The differential amplifier 501 is formed in the area illustrated by the numeric symbol 186. Part of the p-channel MOS transistor of the differential amplifier 501 is formed in the area illustrated by the numeric symbol 187, and part of the n-channel MOS transistor of the differential amplifier 501 is formed in the area illustrated by the numeric symbol 188. The numeric symbol 181 illustrates a metal wiring that connects the series connection node of the resistors R1, R2 to the phase compensating resistor Rc2. The numeric symbol 182 illustrates a metal wiring that connects the non-inverted input terminal of the differential amplifier 501 and the phase compensating resistor Rc2.

Figure 19:
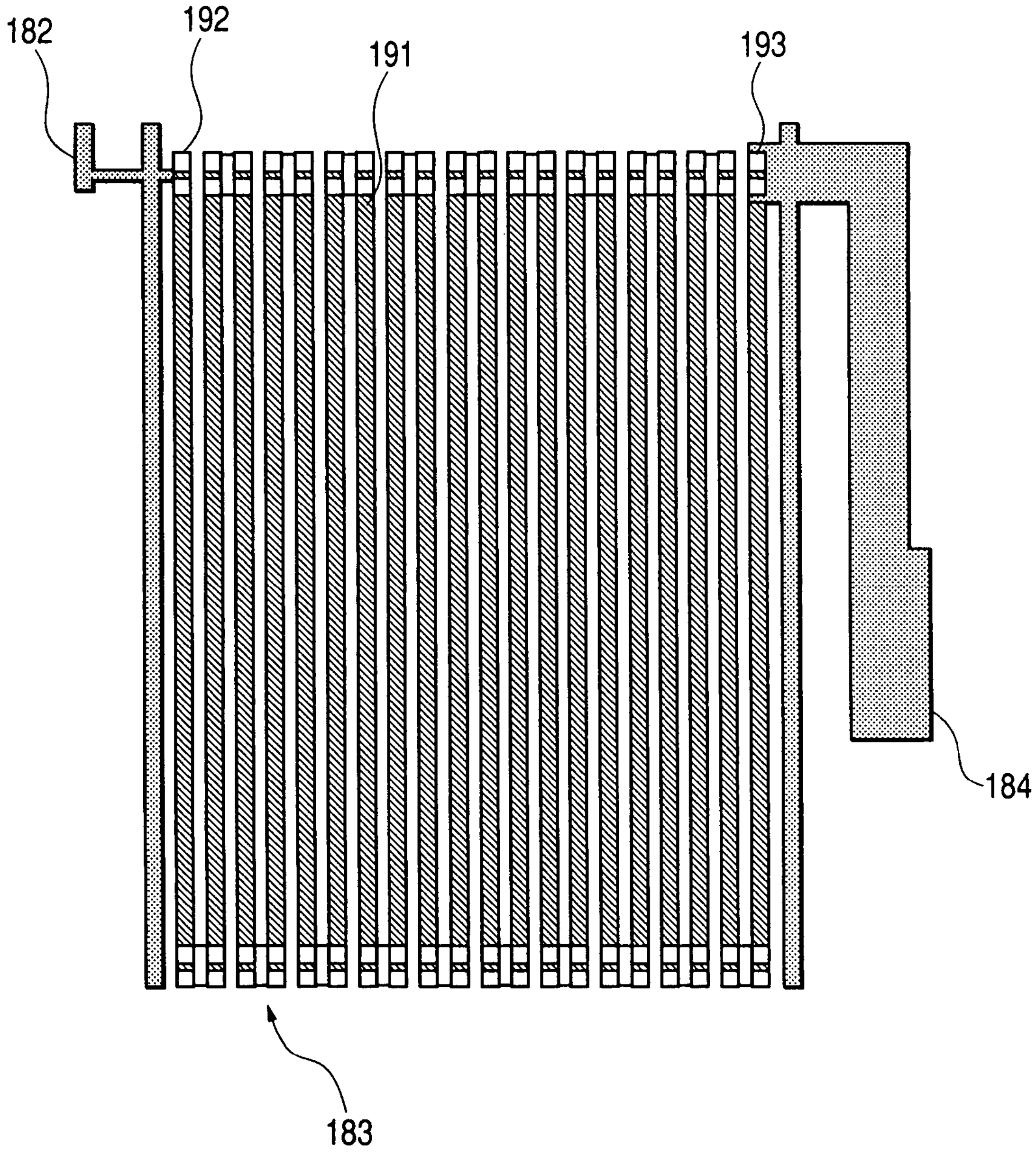
FIG. 19 enlargedly illustrates a major part (183) in FIG. 18.

FIG. 19 enlargedly illustrates the area 183, where the phase compensating resistor Rc2 is formed in FIG. 18 with a poly-silicon layer. Plural poly-silicon layers 191 to form the resistor are formed in parallel. And, to connect these layers in series will form the phase compensating resistor Rc2. The metal wirings 182, 184 and the poly-silicon layers 191 are connected by way of through holes.

Figure 20:
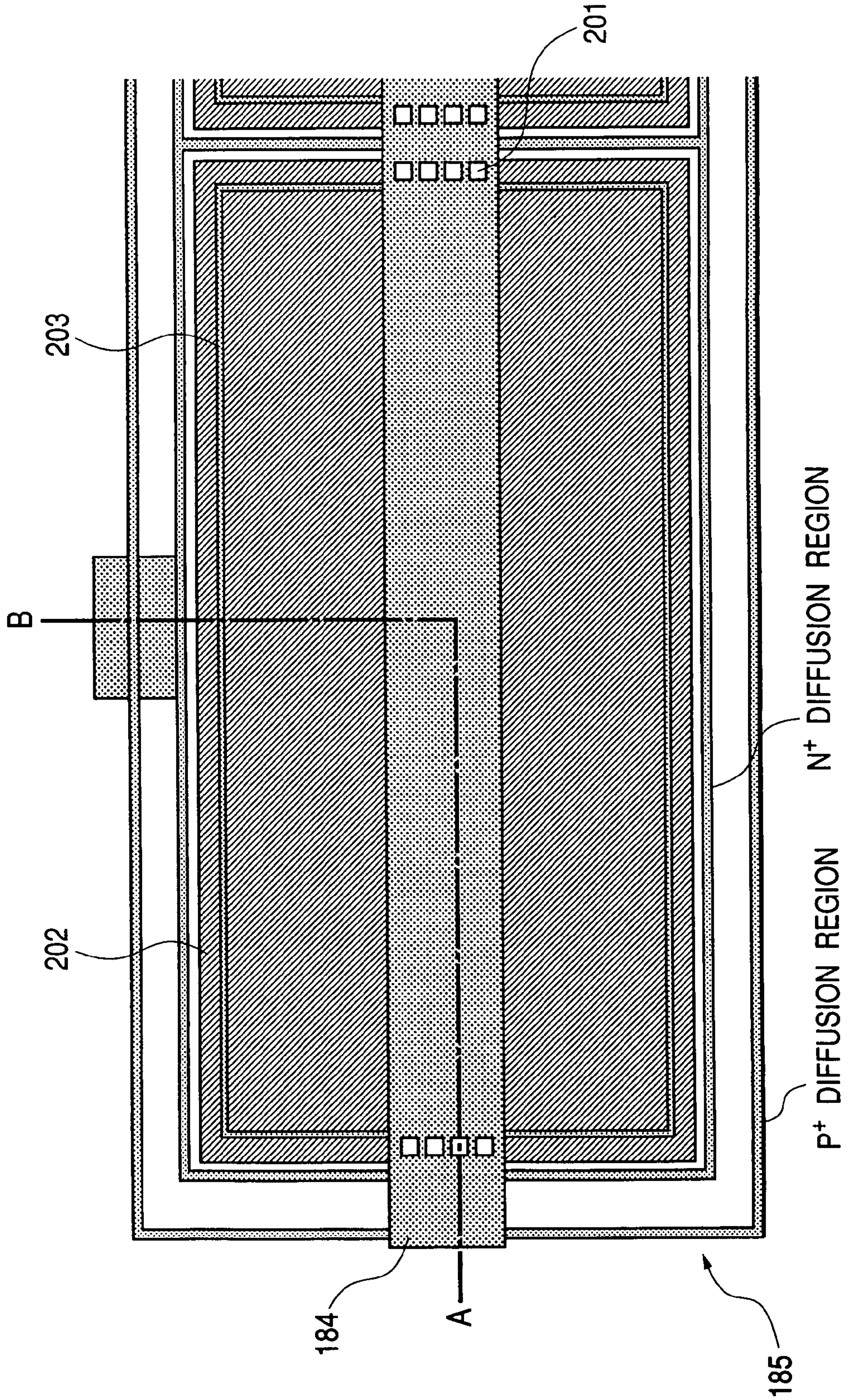
FIG. 20 enlargedly illustrates a major part (185) in FIG. 18.
Figure 21:
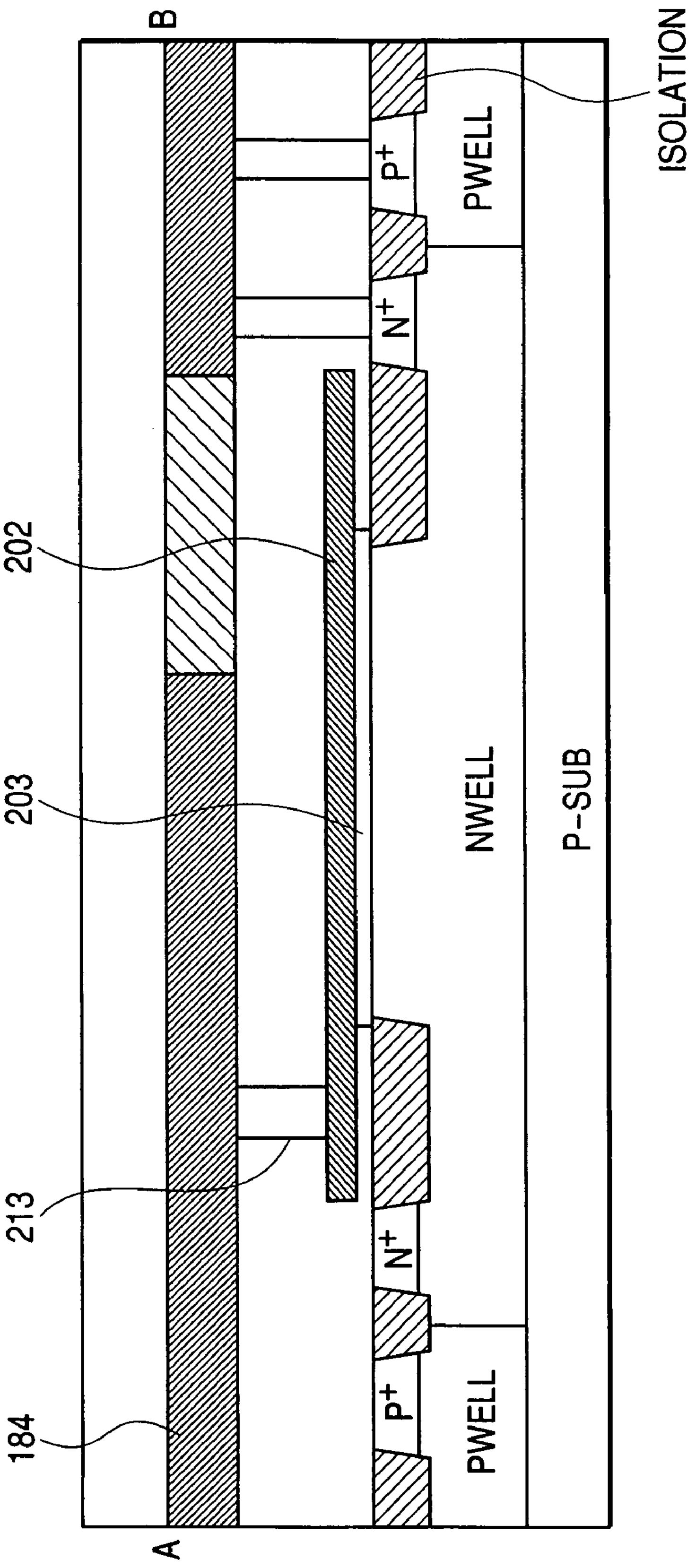
FIG. 21 illustrates a section taken on the line A-B in FIG. 20.

FIG. 20 enlargedly illustrates part of the area 185, where the phase compensating capacitor Cc2 is formed in FIG. 18. FIG. 21 illustrates a section taken on the line A-B in FIG. 20.

A poly-silicon gate electrode 202 is formed on a gate oxide film 203, and the poly-silicon gate electrode 202 is made conductive to the metal wiring 184 by way of a through hole 213.

According to the above embodiment, the following functions and effects can be achieved.

(1) Since the embodiment includes the phase compensating resistor Rc2 and the phase compensating capacitor Cc2, the voltage-dividing resistor stage newly bears the pole frequency P3 and the zero point that are created by the phase compensating resistor Rc2 and the phase compensating capacitor Cc2 in the Bode diagram illustrated in FIG. 7. As the result, the first pole frequency in the overall gain is determined by the first pole frequency P3 in the voltage-dividing resistor stage, and is shifted to a lower frequency;

since the first pole frequency in the differential amplifier stage is cancelled by the zero point, the phase delay is reduced, and thereby the phase margin can be secured.

(2) In the circuit configuration illustrated in FIG. 1, the pole frequency P3 illustrated in FIG. 7 is given by the expression that is proportional to the inverse number of the product of Rc2 and Cc2 in FIG. 1; accordingly, the resistance of the phase compensating resistor Rc2 can separately be set from the output resistance of the p-channel MOS transistor 504.

Accordingly, a considerably high resistance can be selected for the phase compensating resistor Rc2. Since the phase compensating resistor Rc2 can take a considerably high resistance, the phase compensating capacitor Cc2 can select a low capacitance to attain the same characteristic. Therefore, the phase compensating resistor Rc2 and the phase compensating capacitor Cc2 can be implemented by a smaller size than the phase compensating resistor Rc1 and the phase compensating capacitor Cc1 for the pole/zero compensation. As the result, the resistance of the metal wiring for the internal supply voltage VDDI can be reduced without considering the phase margin of the limiter circuits 105 through 112, and thereby the stable operation of the limiter circuits 105 through 112 can be attained. Further, the circuit is allowed to take on a MOS with a short gate length as the p-channel MOS transistor 504 without apprehension of the drain conductance, which makes it possible to achieve the limiter circuits 105 through 112 capable of handling a chip that consumes a considerably high current.

(3) Since the wiring resistance of the internal supply voltage can be reduced without considering the phase margin of the limiter circuits 105 through 112, the lowering of the internal supply voltage due to the voltage drop by the wiring resistance can be decreased, which enhances the frequency characteristic. And, since a large phase margin of the limiter circuit can be attained, the reliability of the product (semiconductor integrated circuit device) can be enhanced.

Next, the other circuit configurations will be described.

Figure 22:
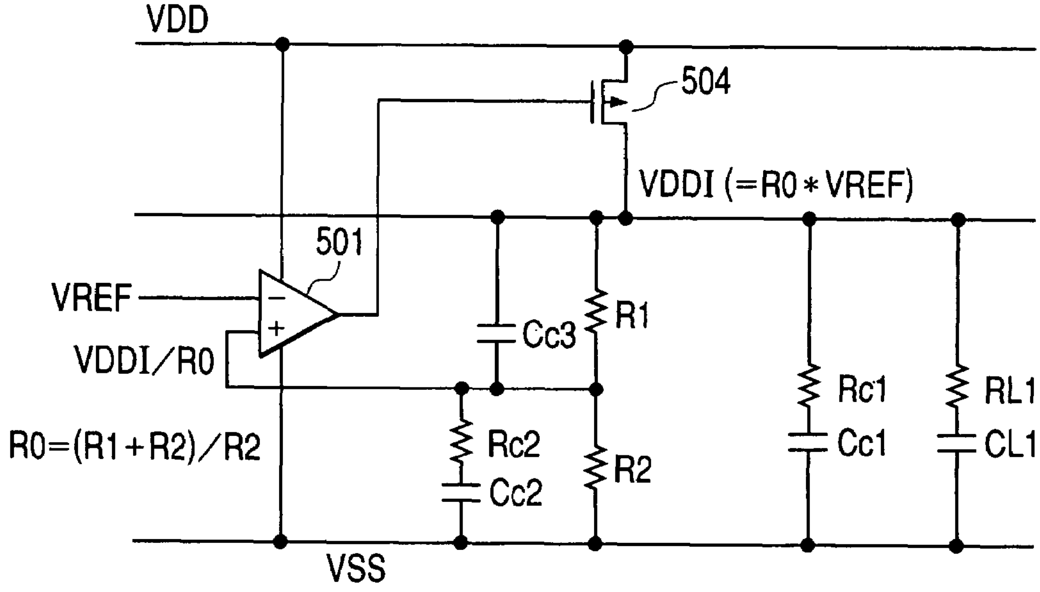
FIG. 22 illustrates another circuit for the limiter circuit.
Figure 23:
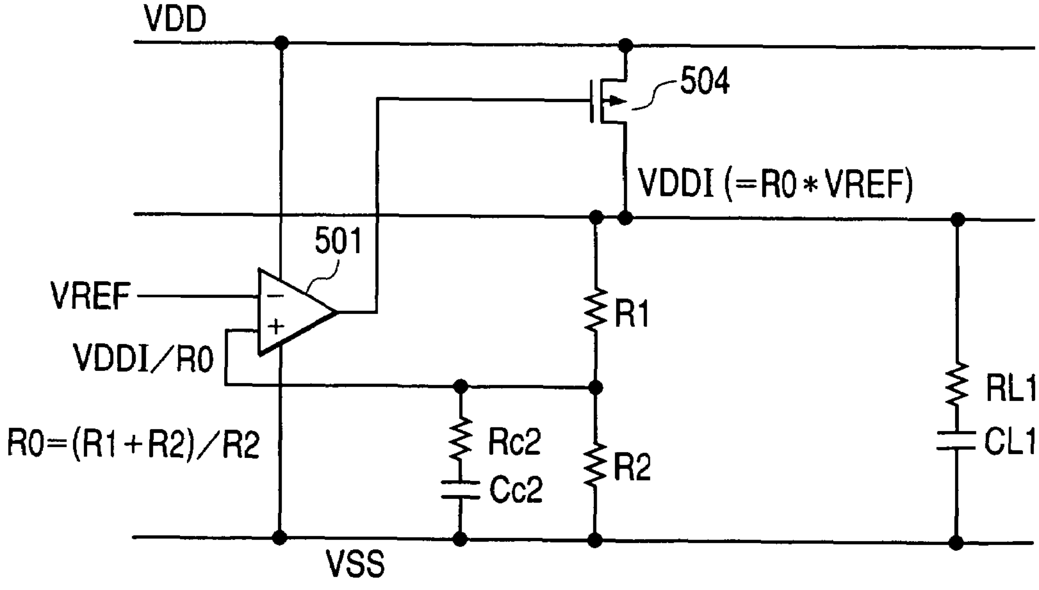
FIG. 23 illustrates another circuit for the limiter circuit.

FIG. 22 and FIG. 23 illustrate the other configurations for the limiter circuit.

A remarkable difference of the circuit illustrated in FIG. 22 against the one illustrated in FIG. 1 lies in a phase compensating capacitor Cc3 being added in FIG. 22. The phase compensating capacitor Cc3 exhibits an effect of reducing the phase delay of the high frequency side. By using the phase compensating capacitor Cc3 in combination with the phase compensating resistor Rc2 and the phase compensating capacitor Cc2, it becomes possible to further expand the phase margin.

A remarkable difference of the circuit illustrated in FIG. 23 against the one illustrated in FIG. 1 lies in that the phase compensating resistor RL1 and the phase compensating capacitor Cc1 are omitted in FIG. 23. When a sufficient phase margin is attained by the phase compensating resistor Rc2 and the phase compensating capacitor Cc2, the phase compensating resistor RL1 and the phase compensating capacitor Cc1 (see FIG. 22) can be omitted as shown in FIG. 23, and thereby the layout area can be reduced.

While the embodiment has been described concretely, the invention is not limited to that, and it should be well understood that various changes and modifications are possible without a departure from the spirit and scope of the invention.

For example, the memory blocks 101, 102 illustrated in FIG. 10 are formed to array plural static memory cells in matrix, however the memory blocks 101, 102 may be formed to array plural dynamic memory cells in matrix. That is, when the semiconductor chip 20 is configured as a dynamic random access memory (DRAM), and when the limiter circuits 105 through 112 are provided for the power supply to the internal circuits, it is possible to adopt the circuit configuration illustrated in FIG. 1, FIG. 22, or FIG. 23 as the limiter circuits 105 through 112. In that case, the same functions and effects as the above can be achieved.

In the above descriptions, the invention has been explained in case it is applied to the SRAM and DRAM being the applicable field, which is the background of the invention. However, the invention is not limited to those, and it can widely be applied to various semiconductor integrated circuit devices.

The invention can be applied to a case, on condition that it includes a power supply circuit at least.

The effects given by the typical ones of the invention disclosed in this application will be described briefly as follows.

That is, by forming a power supply circuit including a phase compensating capacitor provided between the second input terminal of the differential amplifier and the low supply voltage, the first pole frequency in the overall gain is determined by the first pole frequency in the voltage-dividing resistor stage in the Bode diagram for the pole/zero compensation, which is shifted to a lower frequency. And, in the Bode diagram for the pole/zero compensation, the zero point cancels the first pole frequency in the differential amplifier stage, which reduces the phase delay to secure the phase margin. Further, since the resistance of the phase compensating resistor can separately be set from the output resistance of the driver PMOS, a considerably high resistance can be selected for the phase compensating resistor. Since the phase compensating resistor can take a considerably high resistance, the phase compensating capacitor can select a low capacitance to attain the same characteristic. Therefore, the phase compensation can be implemented with a resistor and a capacitor having a smaller size than the phase compensating resistor and the phase compensating capacitor for executing the pole/zero compensation with the internal supply voltage (VDDI). Thereby, the resistance of the metal wiring for the internal supply voltage (VDDI) can be reduced without considering the phase margin of the limiter circuit, and a stable operation of the limiter circuit can be achieved accordingly.

What is claimed is:

1. A semiconductor memory device which has a power supply circuit, the power supply circuit comprising:

a differential amplifier including a first input terminal, a second input terminal, and an output terminal, being supplied with a high supply voltage and a low supply voltage having a voltage lower than the high supply voltage, which amplifies a difference of an input signal from the first input terminal and an input signal from the second input terminal and outputs the difference as an output signal;

a transistor that is controlled on the basis of the output signal, and generates a voltage different from the high supply voltage and the low supply voltage;

a first resistor connected between the output terminal of the transistor and the second input terminal of the differential amplifier;

a second resistor connected between the second input terminal of the differential amplifier and the low supply voltage and forms a voltage-dividing resistor stage with the first resistor, and a memory cell array having a plurality of memory cells coupled to the output terminal of the transistor, wherein the power supply circuit includes a first phase compensating capacitor whose one end is coupled to the low supply voltage and the other end is connected to the voltage-dividing resistor stage and the second input terminal of the differential amplifier.

2. A semiconductor memory device according to claim 1, further comprising a reference voltage generation circuit that generates a reference voltage, wherein the reference voltage is supplied to the first input terminal.

3. A semiconductor memory device according to claim 1, wherein the power supply circuit includes a first phase compensating resistor provided between the second input terminal and the first phase compensating capacitor.

4. A semiconductor memory device which has a power supply circuit, the power supply circuit comprising:

a differential amplifier including a first input terminal, a second input terminal, and an output terminal, being supplied with a high supply voltage and a low supply voltage having a voltage lower than the high supply voltage, which amplifies a difference of an input signal from the first input terminal and an input signal from the second input terminal and outputs the difference as an output signal;

a transistor that is controlled on the basis of the output signal, and generates a voltage different from the high supply voltage and the low supply voltage;

a first resistor connected between the output terminal of the transistor and the second input terminal of the differential amplifier; and a second resistor connected between the second input terminal of the differential amplifier and the low supply voltage to form a voltage-dividing resistor stage with the first resistor, wherein the power supply circuit includes a first phase compensating capacitor whose one end is coupled to the low supply voltage and the other end is connected to the voltage-dividing resistor stage and the second input terminal of the differential amplifier, wherein a second phase compensating capacitor whose one end is supplied with the voltage from the transistor and the other end is supplied with the low supply voltage, and a second phase compensating resistor connected in series thereto are provided between an output terminal of the transistor and the second phase compensating capacitor.

5. A semiconductor memory device according to claim 1, wherein a capacitor for reducing a phase delay in the high frequency is provided between the output terminal of the transistor and the second input terminal of the differential amplifier.

6. A semiconductor memory device according to claim 3, wherein the first phase compensating resistor uses a resistance of a metal wiring.

7. A semiconductor memory device according to claim 3, wherein the first phase compensating resistor is a resistor using a diffusion layer formed on a semiconductor substrate.

8. A semiconductor memory device according to claim 3, wherein the first phase compensating resistor is a resistor using a conductive layer formed on a semiconductor substrate.

9. A semiconductor memory device according to claim 8, wherein the conductive layer is a poly-silicon layer.

10. A semiconductor memory device according to claim 1, wherein the first phase compensating capacitor is a capacitor using an oxide film formed on a semiconductor substrate as a dielectric.

11. A semiconductor memory device according to claim 1, wherein the first phase compensating capacitor is a capacitor using an insulating film formed on a semiconductor substrate as a dielectric.

12. A semiconductor memory device according to claim 11, wherein the insulating film is a gate oxide film.

* * * * *